(12) United States Patent
Kato et al.

(10) Patent No.: US 9,865,028 B2
(45) Date of Patent: Jan. 9, 2018

(54) INFORMATION DETECTING DEVICE, INFORMATION DETECTING SYSTEM, AND INFORMATION DETECTING METHOD

(71) Applicant: FUJITSU LIMITED, Kawasaki-shi, Kanagawa (JP)

(72) Inventors: Keizo Kato, Kawasaki (JP); Kensuke Kuraki, Ichikawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 15/072,003

(22) Filed: Mar. 16, 2016

(65) Prior Publication Data

US 2016/0350890 A1 Dec. 1, 2016

(30) Foreign Application Priority Data

May 28, 2015 (JP) .................................. 2015-108376

(51) Int. Cl.
*G06K 9/00* (2006.01)
*G06T 1/00* (2006.01)
*H04N 1/32* (2006.01)

(52) U.S. Cl.
CPC ............ *G06T 1/0021* (2013.01); *G06T 1/005* (2013.01); *G06T 1/0028* (2013.01);
(Continued)

(58) Field of Classification Search
CPC .... G06T 1/0021; B42D 25/23; B42D 25/333; B42D 2033/20; B41M 3/10
(Continued)

(56) References Cited

U.S. PATENT DOCUMENTS 7,389,939 B2 * 6/2008 Jones ..................... G06K 19/02
235/487
7,856,116 B2 * 12/2010 Rodriguez ............... B41M 3/10
283/72

(Continued)

FOREIGN PATENT DOCUMENTS

EP 1833237 A2 9/2007
EP 2733674 A1 5/2014
(Continued)

OTHER PUBLICATIONS

EESR—European Search Report dated Oct. 19, 2016 for corresponding European Patent Application No. 16160378.2.

*Primary Examiner* — Charlotte M Baker
(74) *Attorney, Agent, or Firm* — Fujitsu Patent Center

(57) ABSTRACT

A memory stores video information obtained by photographing an object that reflects light in which embedded information is superimposed onto a plurality of components in a color space. A processor emphasizes a signal obtained from an image included in the video information on the basis of a result of emphasizing a first color component more than a second color component according to a spectral reflection characteristic in a range including the object, and detects the embedded information from the emphasized signal, the first color component and the second color component being from among a plurality of color components that correspond to a plurality of wavelengths, the first color component having a reflectance higher than a reflectance of the second color component. A display device outputs information on the basis of the embedded information detected by the processor.

18 Claims, 25 Drawing Sheets

(52) U.S. Cl.
CPC ..... *H04N 1/32203* (2013.01); *H04N 1/32208* (2013.01); *H04N 1/32229* (2013.01); *H04N 1/32251* (2013.01); *H04N 1/32288* (2013.01); *H04N 1/32293* (2013.01); *H04N 1/32304* (2013.01); *H04N 1/32309* (2013.01); *G06T 2201/0061* (2013.01); *G06T 2201/0065* (2013.01)

(58) Field of Classification Search
USPC ....... 382/100; 283/72, 85; 340/5.86; 356/71; 348/89; 235/494, 487
See application file for complete search history.

(56) References Cited

U.S. PATENT DOCUMENTS

| | | | |
|---|---|---|---|
| 9,380,186 B2 * | 6/2016 | Reed | H04N 1/32309 |
| 2004/0136562 A1 | 7/2004 | Sarraf et al. | |
| 2005/0041835 A1 | 2/2005 | Reed et al. | |
| 2005/0213125 A1 | 9/2005 | Smith et al. | |
| 2008/0310850 A1 | 12/2008 | Pederson et al. | |
| 2010/0034540 A1 | 2/2010 | Togashi | |
| 2011/0069868 A1 | 3/2011 | Tsuruoka | |
| 2011/0200338 A1 | 8/2011 | Yokoi | |
| 2012/0163653 A1 | 6/2012 | Anan et al. | |
| 2013/0089256 A1 | 4/2013 | Tsukada | |
| 2016/0187199 A1 * | 6/2016 | Brunk | G01J 3/2823 348/89 |

FOREIGN PATENT DOCUMENTS

| | | |
|---|---|---|
| JP | 2008-252570 | 10/2008 |
| JP | 2010-98574 | 4/2010 |
| JP | 2011-009803 | 1/2011 |
| JP | 2012-55582 | 3/2012 |
| JP | 2012-142741 | 7/2012 |
| WO | 01/35323 A1 | 5/2001 |
| WO | 2011/163378 A1 | 12/2011 |

* cited by examiner

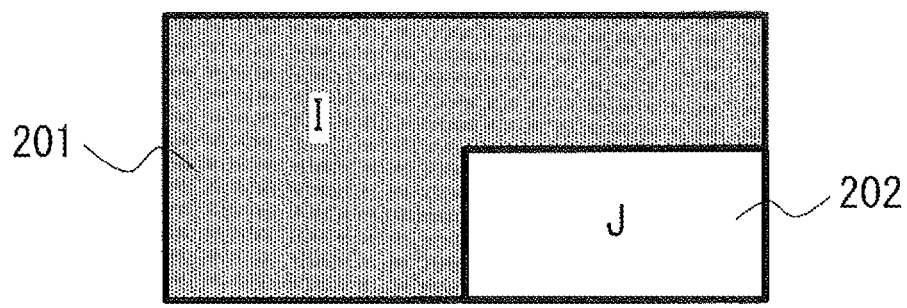
F I G. 2

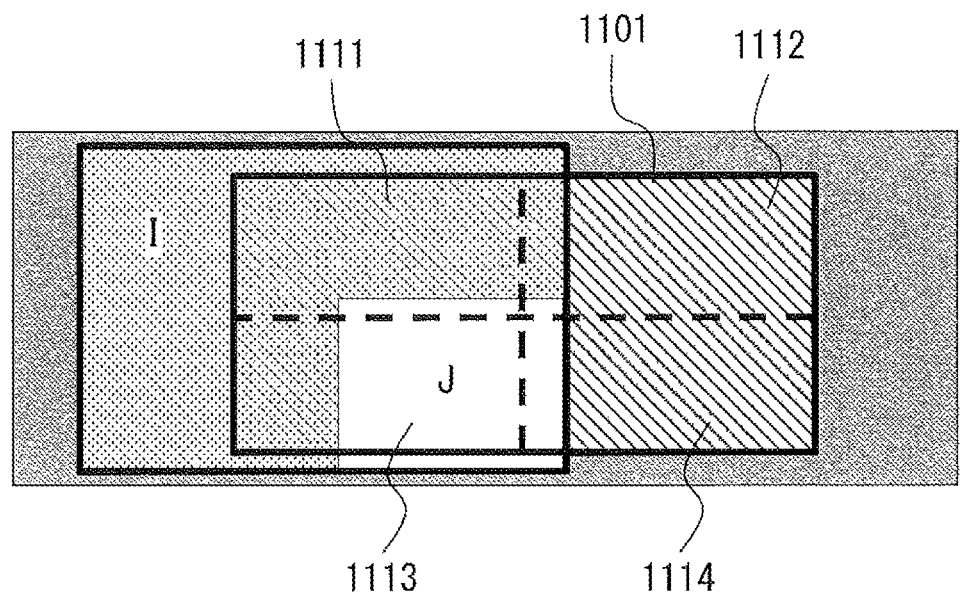
F I G. 1 1

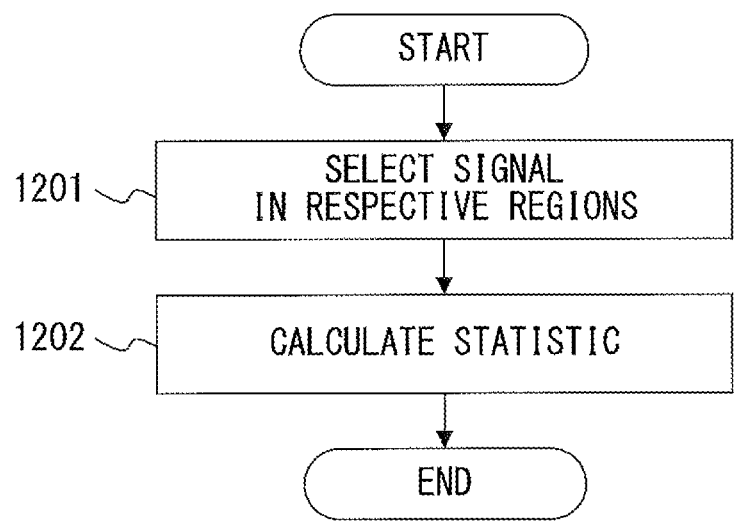
F I G. 1 2

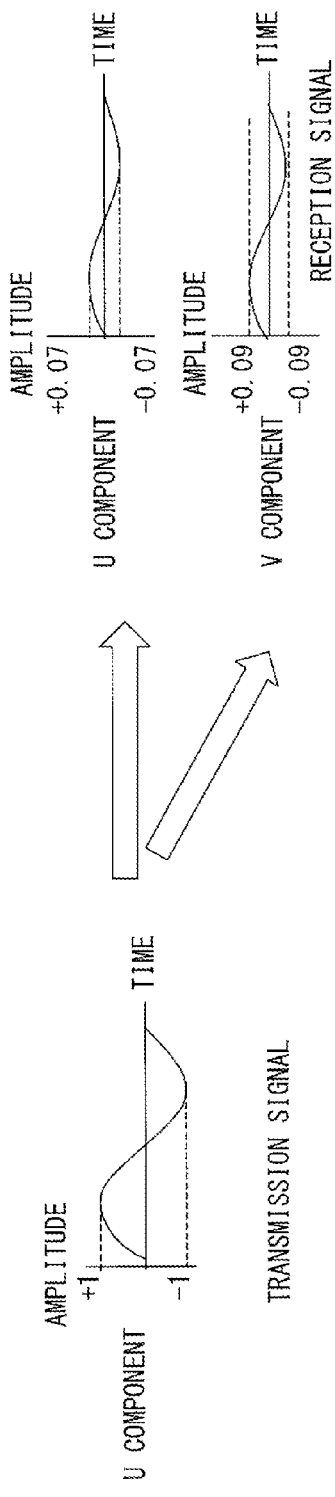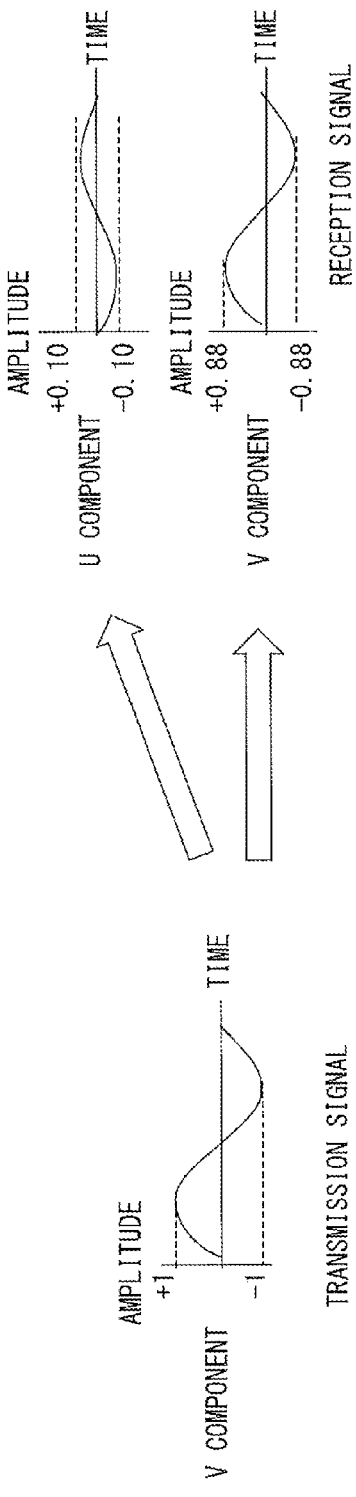

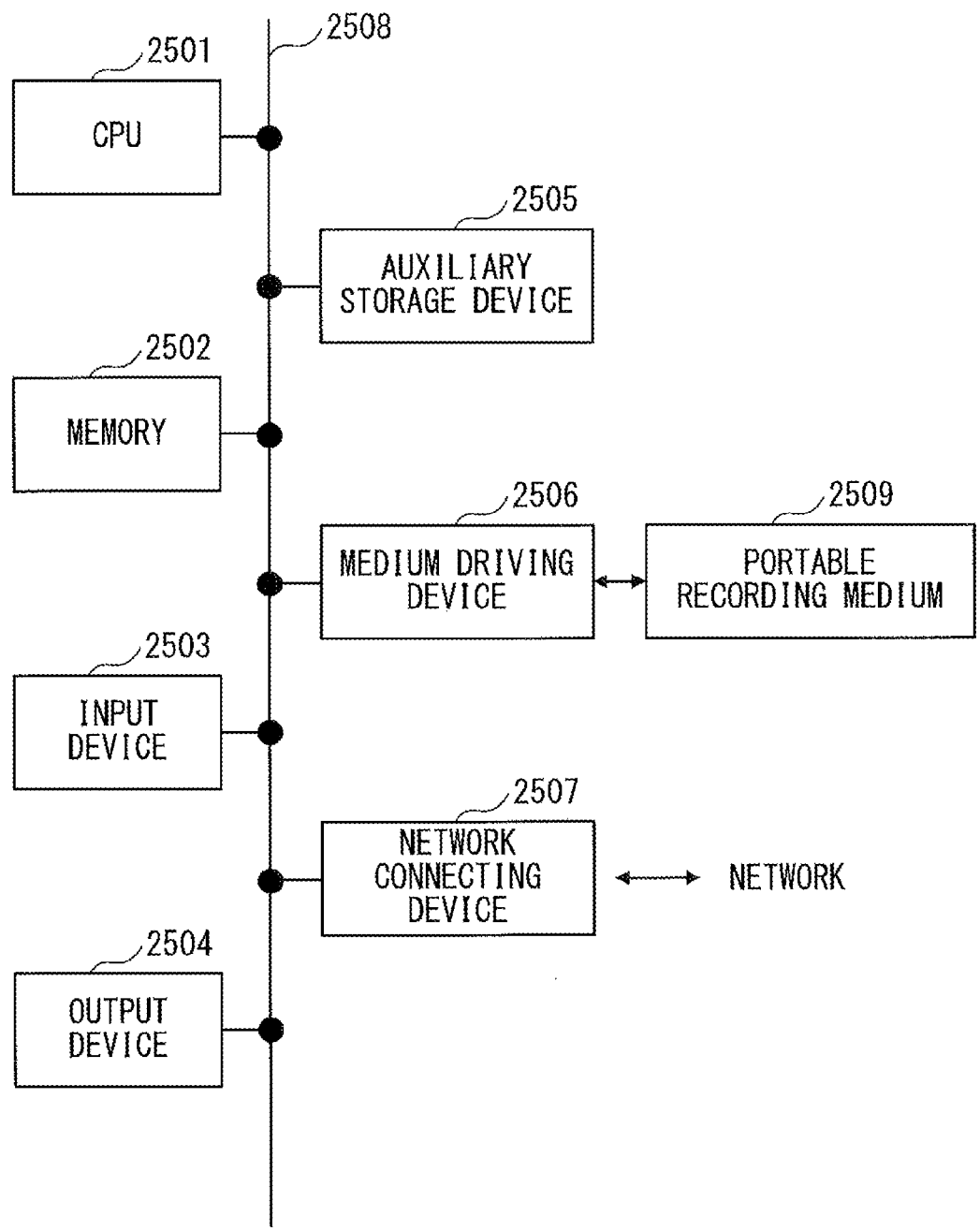
F I G. 2 5

INFORMATION DETECTING DEVICE, INFORMATION DETECTING SYSTEM, AND INFORMATION DETECTING METHOD

CROSS-REFERENCE TO RELATED APPLICATION

This application is based upon and claims the benefit of priority of the prior Japanese Patent Application No. 2015-108376, filed on May 28, 2015, the entire contents of which are incorporated herein by reference.

FIELD

The embodiments discussed herein are related to an information detecting device, an information detecting system, and an information detecting method.

BACKGROUND

In recent years, distributing of advertisements to smart devices by using digital watermarking, or the like has been spreading.

As one example of a digital watermarking technology, a digital watermark embedding device is known that embeds watermark information into moving image data in such a way that the moving image data does not deteriorate in image quality (see, for example, Patent Document 1). The digital watermark embedding device periodically changes the area of a watermark pattern superimposed onto respective images in the moving image data along time series in accordance with a value of a symbol included in digital watermark information. The digital watermark embedding device corrects values of respective pixels included in a region in which each of the images overlaps a watermark pattern that corresponds to the image, in accordance with a prescribed value that pixels included in the watermark pattern have.

An optical radio communication device is also known that precisely receives information transmitted from a light source that performs optical radio communication (see, for example, Patent Document 2). The optical radio communication device detects an image of a light source in a photographed image obtained by photographing one or more light sources including an optical radio communication light source, and obtains position information of an image of the optical radio communication light source from the detected image of the light source. The optical radio communication device obtains information relating to an incident position in which light output from the optical radio communication light source is made incident on the basis of the position information of the image of the optical radio communication light source, and also obtains information that is transmitted from the optical radio communication light source via optical radio communication in the incident position.

Patent Document 1: Japanese Laid-open Patent Publication No. 2012-142741

Patent Document 2: Japanese Laid-open Patent Publication No. 2011-009803

SUMMARY

According to an aspect of the embodiments, an information detecting device includes a memory, a processor, and a display device.

A memory stores video information obtained by photographing an object that reflects light in which embedded information is superimposed onto a plurality of components in a color space. A processor emphasizes a signal obtained from an image included in the video information on the basis of a result of emphasizing a first color component more than a second color component according to a spectral reflection characteristic in a range including the object, and detects the embedded information from the emphasized signal, the first color component and the second color component being from among a plurality of color components that correspond to a plurality of wavelengths, the first color component having a reflectance higher than a reflectance of the second color component. A display device outputs information on the basis of the embedded information detected by the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an image obtained by photographing a target object;

FIG. 11 illustrates an image in which a boundary between regions does not match a boundary between objects;

FIG. 12 is a flowchart of a first emphasizing process;

FIG. 17A and FIG. 17B illustrate interference between a U component and a V component;

FIG. 25 illustrates a hardware configuration of an information processing device.

DESCRIPTION OF EMBODIMENTS

Embodiments are described below in detail with reference to the drawings.

The digital watermark embedding device described in Patent Document 1 is applied to an illuminating device, a projector, or the like so as to embed information into light with which an object is irradiated, and consequently embedded information relating to the object can be obtained from a video obtained by photographing the object.

However, in information distribution using digital watermarking, it is difficult to stably detect information included in reflected light from an object.

Figure 1:
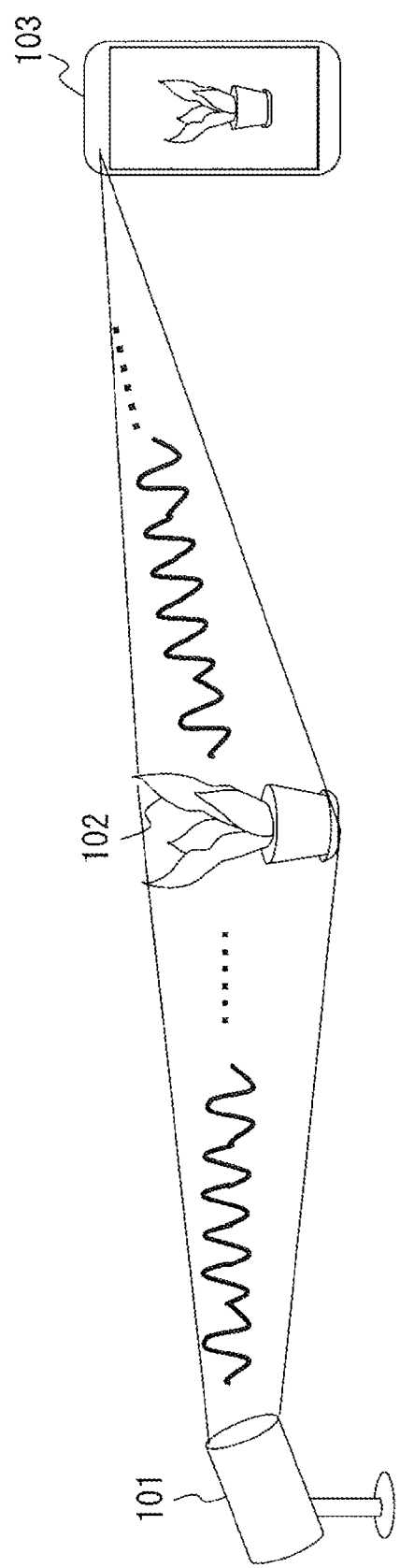
FIG. 1 illustrates information distribution using reflected light.

FIG. 1 illustrates an example of information distribution using reflected light from an object. An illuminating device 101 irradiates an object 102 with light in which embedded information has been superimposed onto each of an R component (red), a G component (green), and a B component (blue) in an RGB color space. A smart device 103 photographs light reflected from the object 102 by using a camera, detects the embedded information by analyzing a photographed video, and displays the detected embedded information on a screen.

In the information distribution described above, even a store or the like in which a video display device is not installed can easily distribute information relating to items or the like. Therefore, it is expected that information distribution using reflected light will be widely spread in the future.

In the information distribution using reflected light, embedded information is superimposed onto a color of radiated light. Light of a color having a low reflectance is not reflected so much according to a spectral reflection characteristic of a surface of the object 102, and consequently an accuracy of detecting embedded information superimposed onto the color decreases. Accordingly, an accuracy of detecting embedded information obtained from reflected light varies depending on a spectral reflection characteristic of an object, and information is not always detected stably.

Assume that a wavelength of light is $\lambda$. A spectral distribution $C(\lambda)$ of reflected light that is actually observed is expressed by the product of a spectral distribution $E(\lambda)$ and a spectral reflectance $R(\lambda)$ of light incident to an object.

$$C(\lambda)=E(\lambda)R(\lambda) \quad (1)$$

As an example, when a strawberry and a lemon are irradiated with blue light, both the strawberry and the lemon absorb light, and therefore images of both of them become dark. When the strawberry and the lemon are irradiated with green light, the strawberry absorbs light, but the lemon reflects light. Therefore, an image of the strawberry becomes dark, and an image of the lemon becomes bright. When the strawberry and the lemon are irradiated with red light, both the strawberry and the lemon reflect light, and therefore images of both of them become bright.

As described above, a spectral reflectance varies according to an object. Accordingly, when another object is around a target object in an image, an accuracy of detecting embedded information may decrease due to an influence of a spectral reflectance of a surrounding object.

FIG. 2 illustrates an example of an image obtained by photographing a target object. A region 202 in the image illustrated in FIG. 2 corresponds to a target object J, and a region 201 corresponds to another object I that exists around the target object J. The area of the region 201 is 0.75, and the area of the region 202 is 0.25.

A case is considered in which a wave-shaped signal having an amplitude of 1 is superimposed onto RGB components of light having a white spectral distribution, and the target object J is irradiated with the light onto which the signal has been superimposed. In this case, a spectral reflection characteristic of an object can be expressed by using a reflectance $\alpha$, a reflectance $\beta$, and a reflectance $\gamma$ that respectively correspond to an R component, a G component, and a B component of light.

Assume that signals superimposed onto RGB components of light are SR, SG, and SB, respectively, that a spectral reflection characteristic $(\alpha, \beta, \gamma)$ of the object I is (1, 0, 0), and that a spectral reflection characteristic $(\alpha, \beta, \gamma)$ of the object J is (1, 1, 1). In this case, due to absorption of light on the surface of an object, an amplitude (XRI, XGI, XBI) of an RGB-component signal of light reflected from the object I is (1, 0, 0), and an amplitude (XRJ, XGJ, XBJ) of an RGB-component signal of light reflected from the object J is (1, 1, 1).

Here, assume that noise (NRI, NGI, NBI) has been superimposed onto an RGB-component signal (SRI, SGI, SBI) obtained from the region 201. (SRI, SGI, SBI) is expressed according to the expression below.

$$(SRI,SGI,SBI)=(SR,0,0)+(NRI,NGI,NBI) \quad (2)$$

Also assume that noise (NRJ, NGJ, NBJ) has been superimposed onto an RGB-component signal (SRJ, SGJ, SBJ) obtained from the region 202. (SRJ, SGJ, SBJ) is expressed according to the expression below.

$$(SRJ,SGJ,SBJ)=(SR,SG,SB)+(NRJ,NGJ,NBJ) \quad (3)$$

When a signal superimposed onto radiated light changes in time series, a time-series change in a mean pixel value of the entirety of a photographed image is substantially the same as a time-series change in the sum of pixel values of all pixels. This is because the mean pixel value of the entirety of the photographed image can be obtained when the sum of the pixel values of all of the pixels is divided by the total number of pixels in the image. Accordingly, an amplitude of a signal represented by the time-series change in the mean pixel value is considered to be proportional to the area of a region including the signal.

As an example, assume that an amplitude in a case in which a signal is included in the entirety of a photographed image is 1. When the signal is included in a region of 75% of the entirety of the photographed image, an amplitude of a signal obtained from the entirety of the photographed image is 0.75. In the example of FIG. 2, a signal (SR', SG', SB') represented by the time-series change in the mean pixel value is obtained according to the expression below.

$$\begin{aligned}(SR', SG', SB') &= \text{area of region } 201 * \text{signal of region } 201 + \\ &\quad \text{area of region } 202 * \text{signal of region } 202 \\ &= 0.75 * (SRI, SGI, SBI) + 0.25 * \\ &\quad (SRJ, SGJ, SBJ) \\ &= (SR, 0.25\,SG, 0.25\,SB) + 0.75 * \\ &\quad (NRI, NGI, NBI) + 0.25 * (NRJ, NGJ, NBJ)\end{aligned} \quad (4)$$

As an example, when noise having a reverse sign that is 0.26 times greater than a signal (SR, SG, SB) has been superimposed onto respective signals of RGB components, (SR', SG', SB') in Expression (4) is expressed according to the expression below.

$$(SR', SG', SB') = (SR, 0.25\,SG, 0.25\,SB) - 0.26*(SR, SG, SB) \quad (5)$$
$$= (0.74\,SR, -0.01\,SG, -0.01\,SB)$$

In this case, a G-component signal and a B-component signal of the signal (SR', SG', SB') are cancelled by the noise, and correct signals fail to be detected.

The problem above does not occur only in the distribution of information to smart devices by using digital watermarking, but the problem above also occurs in another information detecting device that detects embedded information included in reflected light from an object.

Figure 3:
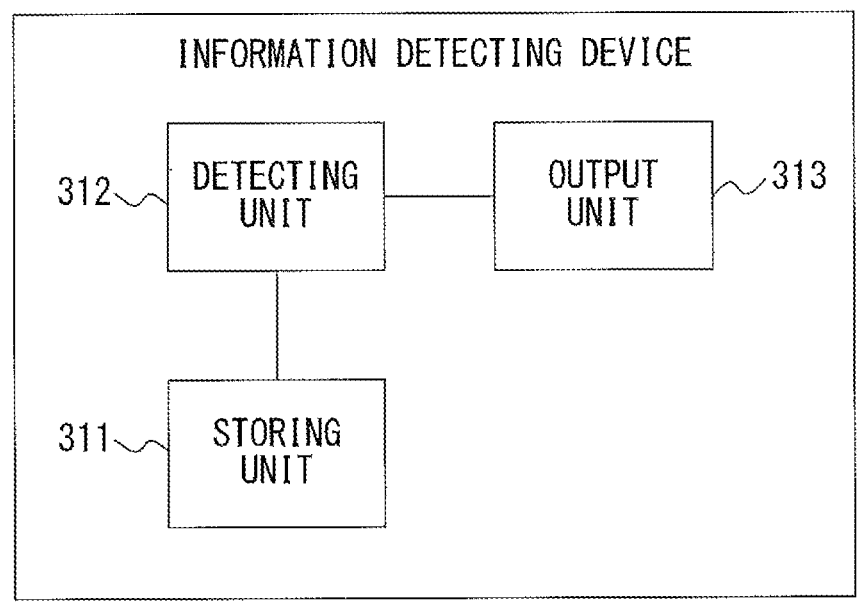
FIG. 3 illustrates a functional configuration of an information detecting device.

FIG. 3 illustrates an exemplary functional configuration of an information detecting device according to the embodiments. An information detecting device 301 of FIG. 3 includes a storing unit 311, a detecting unit 312, and an output unit 313.

The storing unit 311 stores video information obtained by photographing an object that reflects light in which embedded information has been superimposed onto a plurality of components in a color space. The detecting unit 312 detects the embedded information from the video information stored in the storing unit 311. The output unit 313 outputs information on the basis of the embedded information detected by the detecting 312.

Figure 4:
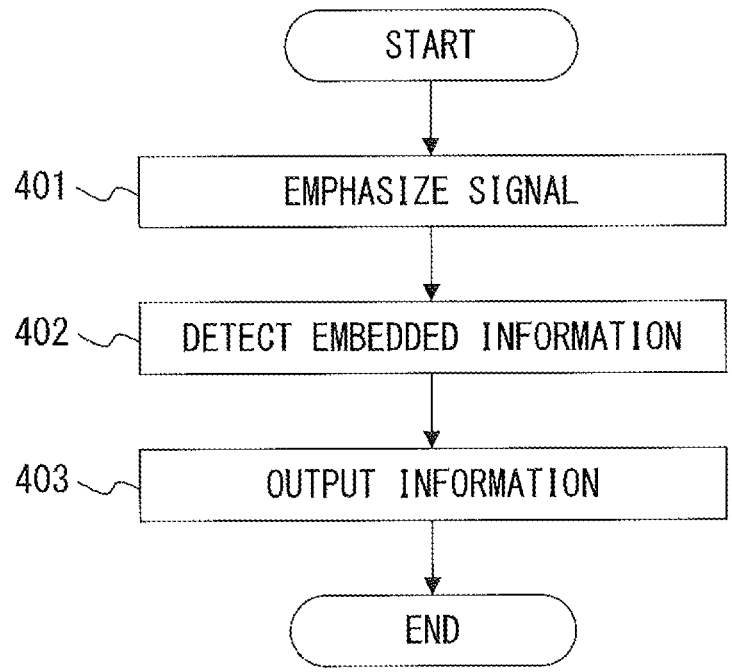
FIG. 4 is a flowchart of an information detecting process.

FIG. 4 is a flowchart illustrating an example of an information detecting process performed by the information detecting device 301 of FIG. 3. The detecting unit 312 first refers to the storing unit 311, and emphasizes a signal obtained from an image included in video information, on the basis of a result of emphasizing a first color component having a reflectance that is higher than the reflectance of a second color component from among a plurality of color components that correspond to a plurality of wavelengths more than the second color component in accordance with a spectral reflection characteristic of a range including an object (step 401).

The detecting unit 312 then detects embedded information from the emphasized signal (step 402), and the output unit 313 outputs the embedded information or other information specified by the embedded information (step 403).

By using the information detecting device 301 described above, embedded information included in reflected light from an object can be detected precisely.

The information detecting device 301 may be a smart device, a portable telephone, a terminal device, or the like that includes a camera used to photograph an object, or may be an information processing device such as a server.

Figure 5:
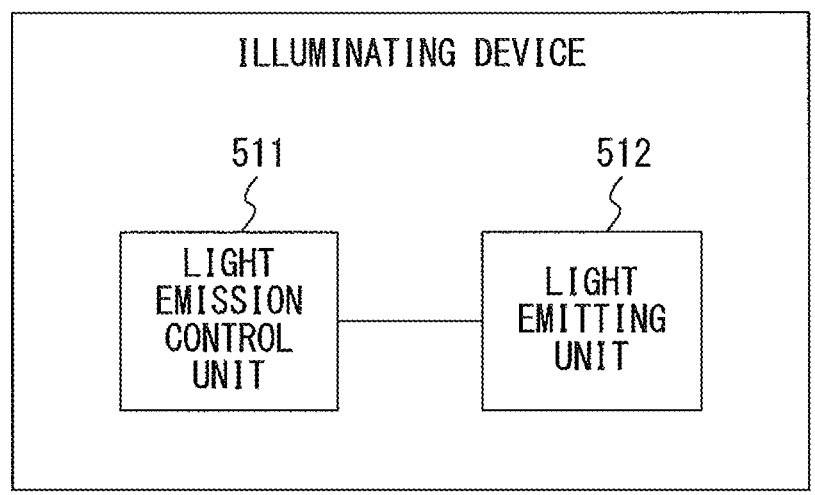
FIG. 5 illustrates a configuration of an illuminating device.

FIG. 5 illustrates an exemplary configuration of an illuminating device according to the embodiments. An illuminating device 501 of FIG. 5 includes a light emission control unit 511 and a light emitting unit 512. The light emitting unit 512 includes, for example, a RGB-component light emitter, and irradiates an object with light including RGB components. The light emission control unit 511 controls an emitted light amount or a phase of a light emitter so as to change RGB components of radiated light in time series, and superimposes embedded information onto the light. A spectral distribution of the radiated light is set, for example, to be white.

The embedded information may be information relating to an object, such as advertisements or commodity explanations, or may be information that is not related to the object. The embedded information may be an ID, a Uniform Resource Locator (URL), or the like that specifies information to be output from an information detecting device.

Figure 6:
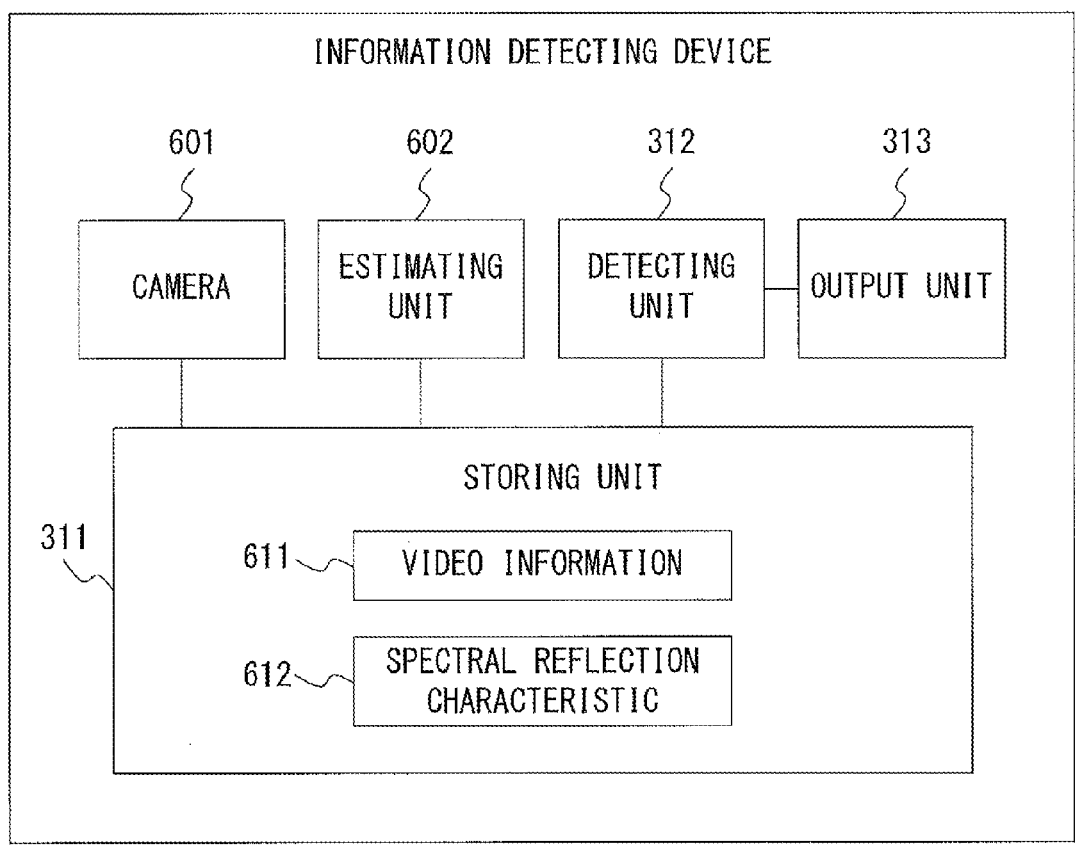
FIG. 6 illustrates a first specific example of an information detecting device.

FIG. 6 illustrates a first specific example of the information detecting device 301 of FIG. 3. The information detecting device 301 of FIG. 6 includes a storing unit 311, a detecting unit 312, an output unit 313, a camera 601, and an estimating unit 602. The camera 601 includes a photodetector that receives reflected light from an object, and the camera 601 photographs the object so as to generate video information 611, and stores the video information 611 in the storing unit 311. The estimating unit 602 estimates a spectral reflection characteristic 612 of the object by using the video information 611, and stores the spectral reflection characteristic 612 in the storing unit 311.

Figure 7:
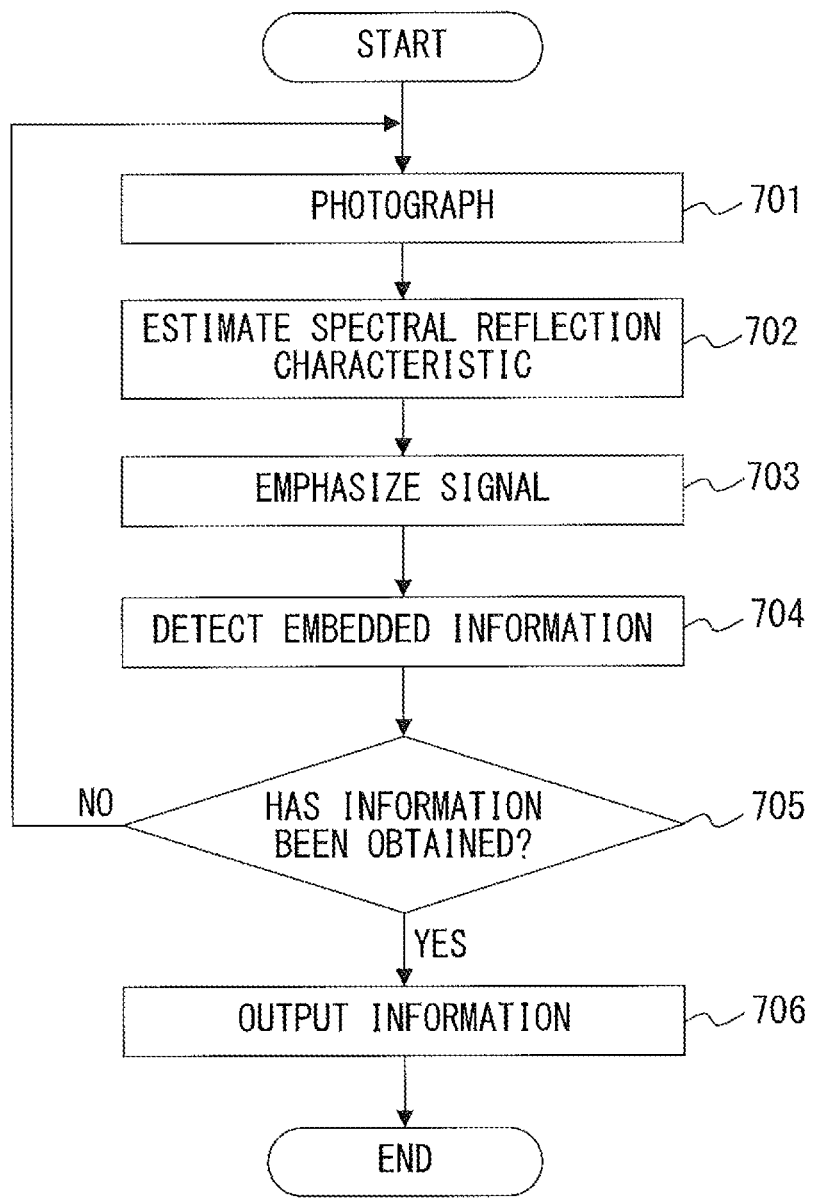
FIG. 7 is a flowchart illustrating a first specific example of an information detecting process.

FIG. 7 is a flowchart illustrating an example of an information detecting process performed by the information detecting device 301 of FIG. 6. The camera 601 first photographs an object so as to generate an image of the object, and stores the image as the video information 611 in the storing unit 311 (step 701). Then, the estimating unit 602 estimates the spectral reflection characteristic 612 of the object by using the image included in the video information 611, and stores the spectral reflection characteristic 612 in the storing unit 311 (step 702).

Then, the detecting unit 312 emphasizes a signal obtained from the image included in the video information 611 in an emphasizing process according to the spectral reflection characteristic 612 (step 703), and detects embedded information from the emphasized signal. The detecting unit 312 then checks whether prescribed information has been obtained (step 705).

The detecting unit 312 can determine that prescribed information has been obtained, for example, when the prescribed number of symbols have been detected or when a result of error detection indicates no errors. The detecting unit 312 may determine that prescribed information has been obtained when a symbol has been detected from a video during a prescribed time period.

When prescribed information has not been obtained (step 705: NO), the information detecting device 301 repeats the process of step 701 and the processes that follow. When prescribed information has been obtained (step 705: YES), the output unit 313 outputs embedded information that corresponds to the prescribed information, or other information specified by the embedded information (step 706).

When embedded information is an ID, a URL, or the like that specifies other information, the detecting unit 312 can access an external device such as a server on the basis of the embedded information so as to obtain the other information from the external device. Then, the output unit 313 outputs the obtained information. The output unit 313 can display, for example, a text, an illustration, or an image that indicates the embedded information or the other information on a screen.

Figure 8:
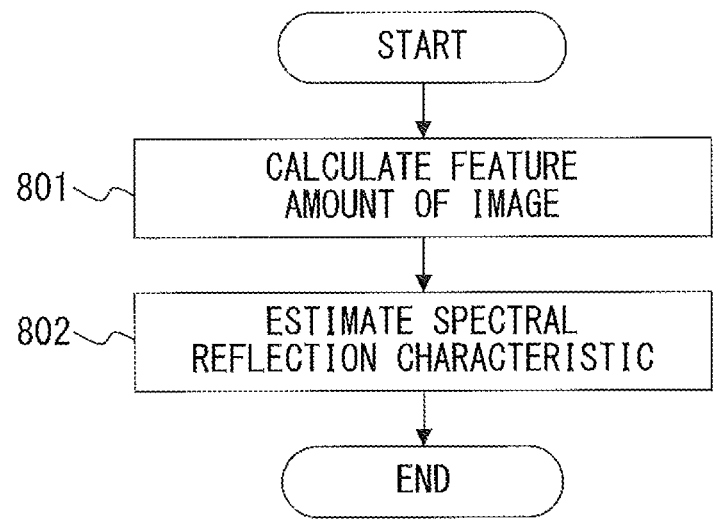
FIG. 8 is a flowchart of a first estimating process.

FIG. 8 is a flowchart illustrating an example of a first estimating process in step 702 of FIG. 7. The estimating unit 602 first calculates a feature amount of an image (step 801). As the feature amount of the image, a statistic, such as a mean value, the sum, a maximum value, a minimum value, a mode, or a median of pixel values of pixels in an image, can be used.

Then, the estimating unit 602 estimates the spectral reflection characteristic 612 by using the calculated feature amount (step 802). At this time, the estimating unit 602 calculates a statistic of pixel values for respective color components of RGM components in a region, and estimates reflectances of the respective color components from the statistics of the respective color components. The estimating unit 602 may calculate a ratio of a statistic to a gradation range of each of the color components, and may use the calculated ratio as a reflectance of each of the color components.

In this case, the detecting unit 312 selects a signal of a specific color component from among RGB components on the basis of the spectral reflection characteristic 612 in step 703 of FIG. 7, and detects embedded information from the selected signal of the color component in step 704. The detecting unit 312 may select, for example, one or more color components having a reflectance that is greater than a prescribed threshold as a specific color component. By doing this, as a color component has a higher reflectance, the color component has a higher probability of being used to detect embedded information, and consequently a color component having a high reflectance is emphasized more than a color component having a low reflectance.

As an example, when a gradating range of each of the color components is 0 to 255, and mean values of RGB components are (128, 255, 64), a spectral reflection characteristic ($\alpha$, $\beta$, $\gamma$) is calculated according to the expression below.

$$(\alpha, \beta, \gamma) = (128/255, 255/255, 64/255) \quad (11)$$
$$= (0.5, 1.0, 0.25)$$

When a threshold of a reflectance is 0.5, a G component of the RGB components is selected, and embedded information is detected from a signal of the G component. By doing this, the G component having a reflectance that is higher than reflectances of an R component and a B component is emphasized more than the R component and the B components.

Figure 9:
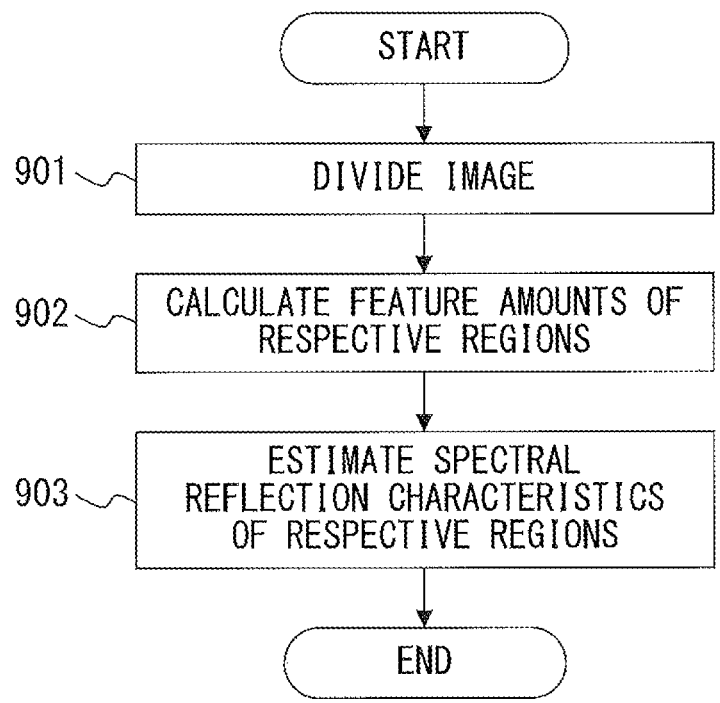
FIG. 9 is a flowchart of a second estimating process.

FIG. 9 is a flowchart illustrating an example of a second estimating process in step 702 of FIG. 7. The estimating unit 602 first divides an image into a plurality of regions (step 901), and calculates a feature amount in each of the plurality of regions (step 902). As the feature amount in each of the regions, a statistic of pixel values of pixels in each of the regions can be used, for example.

Then, the estimating unit 602 estimates the spectral reflection characteristic 612 of each of the regions by using the feature amount in each of the regions (step 903). At this time, the estimating unit 602 calculates a statistic of pixel values for each of the components of RGB components in each of the regions, and estimates a reflectance of each of the color components from the statistic for each of the color components.

Figure 10:
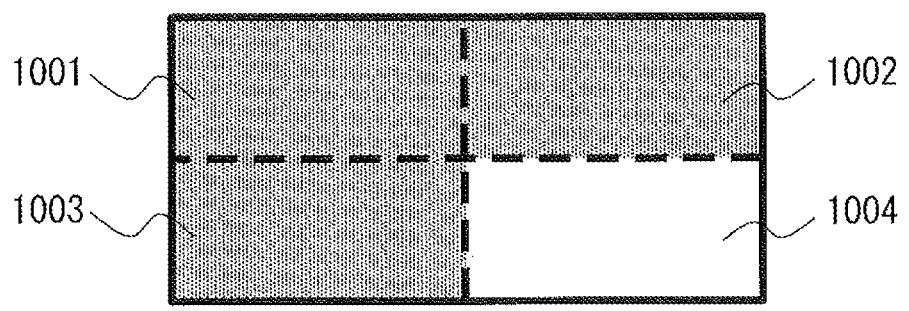
FIG. 10 illustrates division of an image.

As an example, when the image illustrated in FIG. 2 is divided into four (2×2) regions, the image is divided into regions 1001 to 1004, as illustrated in FIG. 10. From among these regions, the regions 1001 to 1003 correspond to the region 201 in FIG. 2, and the region 1004 corresponds to the region 202. As an example, when mean values of RGB components in each of the regions 1001 to 1003 are (255, 0, 0), a spectral reflection characteristic ($\alpha$, $\beta$, $\gamma$) of these regions is calculated according to the expression below.

$$(\alpha, \beta, \gamma) = (255/255, 0/255, 0/255) \quad (12)$$
$$= (1, 0, 0)$$

When mean values of RGB components in the region 1004 are (255, 255, 255), a spectral reflection characteristic of the region 1004 is calculated according to the expression below.

$$(\alpha, \beta, \gamma) = (255/255, 255/255, 255/255) \quad (13)$$
$$= (1, 1, 1)$$

In the example of FIG. 10, a boundary between the region 1002 and the region 1004 matches a boundary between the object I and the object J, and a boundary between the region 1003 and the region 1004 also matches the boundary between the object I and the object J. However, when an image is divided into a plurality of regions, a boundary between regions does not always match a boundary between objects.

FIG. 11 illustrates an example of an image in which a boundary between regions does not match a boundary between objects. When a photographed image 1101 includes an object I, an object J, and a background, and the image 1101 is divided into regions 1111 to 1114, the regions 1111 and 1113 include the object I and the object J. The region 1112 includes the object I, the object J, and the background, and the region 1114 includes the object J and the background.

As an example, when mean values of RGB components in the region 1111 are (255, 13, 13), a spectral reflection characteristic ($\alpha$, $\beta$, $\gamma$) of the region 1111 is calculated according to the expression below.

$$(\alpha, \beta, \gamma) = (255/255, 13/255, 13/255) \quad (14)$$
$$= (1.0, 0.05, 0.05)$$

When mean values of RGB components in the region 1112 are (26, 2, 230), a spectral reflection characteristic ($\alpha$, $\beta$, $\gamma$) of the region 1111 is calculated according to the expression below.

$$(\alpha, \beta, \gamma) = (26/255, 2/255, 230/255) \quad (15)$$
$$= (0.1, 0.01, 0.9)$$

When mean values of RGB components in the region 1113 are (255, 153, 153), a spectral reflection characteristic ($\alpha$, $\beta$, $\gamma$) of the region 1111 is calculated according to the expression below.

$$(\alpha, \beta, \gamma) = (255/255, 153/255, 153/255) \quad (16)$$
$$= (1.0, 0.6, 0.6)$$

When mean values of RGB components in the region 1114 are (26, 26, 255), a spectral reflection characteristic ($\alpha$, $\beta$, $\gamma$) of the region 1111 is calculated according to the expression below.

$$(\alpha, \beta, \gamma) = (26/255, 26/255, 255/255) \quad (17)$$
$$= (0.1, 0.1, 1.0)$$

As described above, even when a boundary between regions does not match a boundary between objects, the spectral reflection characteristic 612 of each of the regions can be estimated by using a feature amount of each of the regions.

In the estimating process illustrated in FIG. 8 or 9, the spectral reflection characteristic 612 may be estimated on the basis of a time mean of pixel values of images at a plurality of times during a prescribed time period instead of a pixel value of an image at one time. As an example, when a signal indicating embedded information is a wave-form signal having a prescribed cycle, and a mean of signals in one cycle is a signal having a fixed value, a time mean of pixel values of images at a plurality of times in one cycle can be used. This allows the spectral reflection characteristic 612 to be precisely estimated.

FIG. 12 is a flowchart illustrating an example of a first emphasizing process in step 703 of FIG. 7. The first emphasizing process is performed when the spectral reflection characteristic 612 has been estimated as a result of the estimating process of FIG. 9.

The detecting unit 312 first selects a signal of a specific component in each of the regions on the basis of the spectral reflection characteristic 612 of each of the regions (step 1201). The detecting unit 312 may select, for example, one or more color components having a reflectance that is greater than a prescribed threshold in each of the regions as the prescribed component.

Then, the detecting unit 312 calculates a statistic of signals of the same component that have been selected in a plurality of regions (step 1202). When the respective regions have the same area, the sum, a mean value, a mode, the sum of squares, or the like of a plurality of signals may be used as the statistic, or a statistic based on correlation detection may be used.

When the sum of squares of signals S1(n) to Sm(n) of the same component that have been selected in m regions at time n is used as a statistic S(n), the detecting unit 312 can calculate the statistic S(n), for example, according to the expression below.

$$S(n) = \text{sgn}(S1(n)) * S1(n)^2 + + \text{sgn}(S2(n)) * S2(n)^2 + \ldots + \quad (21)$$
$$\text{sgn}(Sm(n)) * Sm(n)^2$$

sgn(Si(n)) (i=1 to m) in Expression (21) represents a sign of the signal Si(n).

When the statistic based on correlation detection is used, the detecting unit 312 obtains, for example, values τmax1 to τmaxm of variables τ1 to τm that maximize a function f(τ1, τ2, . . . , τm) in the expression below.

$$f(\tau 1, \tau 2, \ldots, \tau m) = \Sigma_{l=n-T}^{l=n} S1(l-\tau 1) * S2(l-\tau 2) * \ldots * Sm(l-\tau m) \quad (22)$$

T in Expression (22) represents a cycle of the signal Si(n). The detecting unit 312 obtains signals S1(n−τmax1) to Sm(n−τmaxm) by using τmax1 to τmaxm, and calculates the sum, a mean value, a mode, the sum of squares, or the like by using a signal Si(n−τmaxi) instead of the signal Si(n).

When the first emphasizing process is performed, the detecting unit 312 detects embedded information by using the calculated statistic in step 704 of FIG. 7.

As an example, when a spectral reflection characteristic (α, β, γ) of the regions 1001 to 1003 of FIG. 10 is (1, 0, 0), and a threshold of a reflectance is 0.5, an R component is selected in the regions 1001 to 1003. As a result, the R component having a reflectance that is higher than reflectances of a G component and a B component is emphasized more than the G component and the B component. When a spectral reflection characteristic (α, β, γ) of the region 1004 is (1, 1, 1), all color components of the R component, the G component, and the B component are selected in the region 1004.

Here, assume that noise (NR1, NG1, NB1) has been superimposed onto an RGB-component signal (SR1, SG1, SB1) obtained from the region 1001. (SR1, SG1, SB1) is expressed according to the expression below.

$$(SR1, SG1, SB1) = (SR, 0, 0) + (NR1, NG1, NB1) \quad (23)$$

Similarly, an RGB-component signal (SR2, SG2, SB2) obtained from the region 1002 and an RGB-component signal (SR3, SG3, SB3) obtained from the region 1003 are expressed according to the expression below.

$$(SR2, SG2, SB2) = (SR, 0, 0) + (NR2, NG2, NB2) \quad (24)$$

$$(SR3, SG3, SB3) = (SR, 0, 0) + (NR3, NG3, NB3) \quad (25)$$

Assume that noise (NR4, NG4, NB4) has been superimposed onto an RGB-component signal (SR4, SG4, SB4) obtained from the region 1004. (SR4, SG4, SB4) is expressed according to the expression below.

$$(SR4, SG4, SB4) = (SR, SG, SB) + (NR4, NG4, NB4) \quad (26)$$

R-component signals SR1 to SR3 are respectively selected in the regions 1001 to 1003, and signals SR4, SG4, and SB4 are selected in the region 1004.

Accordingly, when the sum of a plurality of signals is used as a statistic, a signal (SR', SG', SB') indicating the statistic is calculated according to the expression below.

$$(SR', SG', SB') = (SR1, 0, 0) + (SR2, 0, 0) + \quad (27)$$
$$(SR3, 0, 0) + (SR4, SG4, SB4)$$
$$= (4SR + NR1 + NR2 + NR3 + NR4,$$
$$SG + NG4, SB + NG4)$$

As an example, when noise having a reverse sign that is 0.26 times greater than the signal (SR, SG, SB) has been superimposed onto respective signals of RGB components, (SR', SG', SB') in Expression (27) is expressed according to the expression below.

$$(SR', SG', SB') = (4SR - 4*0.26SR, SG - 0.26SG, SB - 0.26SB) \quad (28)$$
$$= (2.96SR, 0.74SG, 0.74SB)$$

In this case, neither a G-component signal nor a B-component signal of the signal (SR', SG', SB') is cancelled by the noise, and correct signals are detected.

As described above, an influence of noise on a result of detecting embedded information can be suppressed by appropriately setting a threshold of a reflectance and merely selecting a color component for which a signal intensity is estimated to be greater than a noise intensity. In particular, even when a plurality of objects are in a photographed image, embedded information can be precisely detected.

At this time, by subdividing an image so as to increase the number of regions, it is highly likely that a boundary between regions matches a boundary between objects, and this allows a color component to be precisely selected. In respective regions, a color component for which a signal intensity is smaller than a noise intensity is not used, and consequently a processing time is reduced, and error detection is suppressed.

Figure 13:
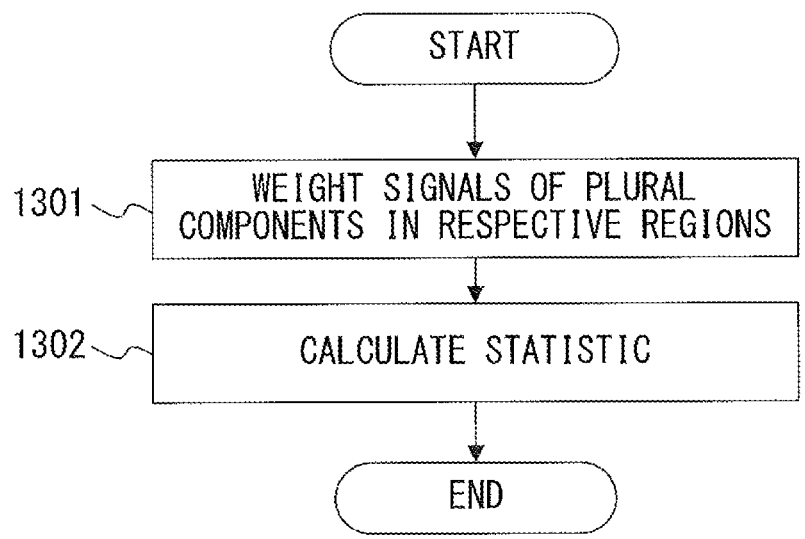
FIG. 13 is a flowchart of a second emphasizing process.

FIG. 13 is a flowchart illustrating an example of a second emphasizing process in step 703 of FIG. 3. The second emphasizing process is also performed when the spectral reflection characteristic 612 has been estimated as a result of the estimating process of FIG. 9.

The detecting unit 312 first weights signals of a plurality of components obtained from respective regions on the basis of the spectral reflection characteristics 612 of the respective regions (step 1301). The detecting unit 312 may weight the signals of the plurality of signals, for example, by using reflectances of the plurality of color components in the respective regions as a weight.

Then, the detecting unit 312 calculates a statistic of signals of the same component that have been weighted in a plurality of regions (step 1302). When respective regions have the same area, the sum, a mean value, a mode, the sum of squares, or the like of a plurality of signals may be used as the statistic, or a statistic based on correlation detection may be used.

When the second emphasizing process is performed, the detecting unit 312 detects embedded information by using the calculated statistic in step 704 of FIG. 7.

Figure 14:
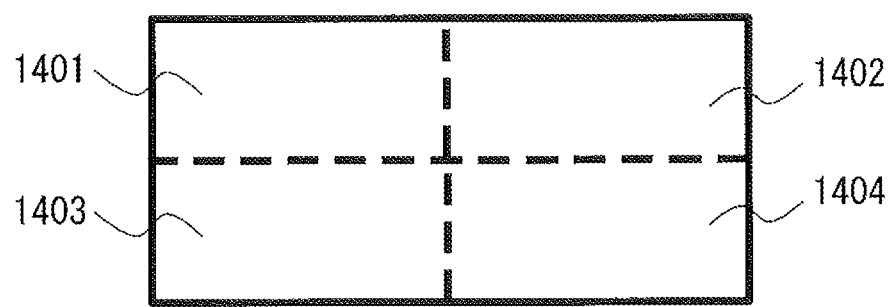
FIG. 14 illustrates an image divided into four regions.

FIG. 14 illustrates an example of an image divided into four regions. A case is considered in which mean values (R, G, B) of RGB components and a spectral reflection characteristic ($\alpha$, $\beta$, $\gamma$) estimated from (R, G, B) in regions 1401 to 1404 are the values below.

Region 1401
(R, G, B)=(255, 0, 0)
($\alpha$, $\beta$, $\gamma$)=(1, 0, 0)
Region 1402
(R, G, B)=(145, 190, 232)
($\alpha$, $\beta$, $\gamma$)=(0.55, 0.76, 0.91)
Region 1403
(R, G, B)=(146, 208, 80)
($\alpha$, $\beta$, $\gamma$)=(0.57, 0.82, 0.31)
Region 1404
(R, G, B)=(255, 255, 255)
($\alpha$, $\beta$, $\gamma$)=(1, 1, 1)

In this case, the detecting unit 312 can multiply RGB-component signals (SR1, SG1, SB1) to (SR4, SG4, SB4) obtained from the regions 1401 to 1404 by spectral reflection characteristics ($\alpha$, $\beta$, $\gamma$) in the respective regions as a weight. By doing this, a color component having a reflectance that is higher than the reflectance of another color component is emphasized more than the other component in the respective regions.

When the sum of signals multiplied by a weight in the regions 1401 to 1404 is used as a statistic, a signal (SR', SG', SB') indicating the statistic is calculated according to the expression below.

$$(SR', SG', SB') = (1*SR1, 0*SG1, 0*SB1) + \quad (31)$$
$$(0.55*SR2, 0.76*SG2, 0.91*SB2) +$$
$$(0.57*SR3, 0.82*SG3, 0.31*SB3) +$$
$$(1*SR4, 1*SG4, 1*SB4)$$
$$= (SR1, 0, 0) +$$
$$(0.55SR2, 0.76SG2, 0.91SB2) +$$
$$(0.57SR3, 0.82SG3, 0.31SB3) +$$
$$(SR4, SG4, SB4)$$
$$= (SR1 + 0.55SR2 + 0.57SR3 + SR4,$$
$$0.76SG2 + 0.82SG3 + SG4,$$
$$0.91SB2 + 0.31SB3 + SB4)$$

As described above, an influence of noise on a result of detecting embedded information can be suppressed by weighting signals of a plurality of components on the basis of spectral reflection characteristics of respective regions. At this time, by subdividing an image so as to increase the number of regions, it is highly likely that a boundary between regions matches a boundary between objects, and as a result, the signals of the plurality of components can be weighted precisely.

Figure 15:
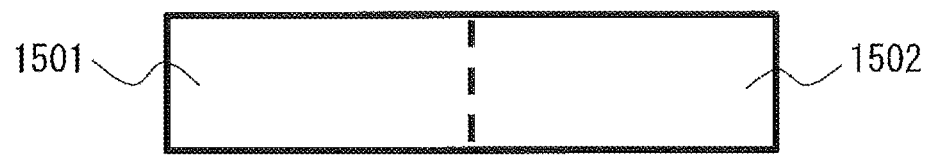
FIG. 15 illustrates an image divided into two regions.

A weighting method for minimizing an influence of noise on the basis of a ratio of noise to a signal is described next. Here, a case is considered in which an image is divided into two regions, as illustrated in FIG. 15, for simplicity. Assume that spectral reflection characteristics ($\alpha$, $\beta$, $\gamma$) of regions 1501 and 1502 are ($\alpha 1$, $\beta 1$, $\gamma 1$) and ($\alpha 2$, $\beta 2$, $\gamma 2$), respectively.

An R-component signal is considered first. Assume that white noise N uniformly distributing in all the regions has been superimposed onto an R-component signal SR1 obtained from the region 1501. The signal SR1 is expressed according to the expression below.

$$SR1 = \alpha 1 * SR + N \quad (32)$$

Assume that the white noise N has been superimposed onto an R-component signal SR2 obtained from the region 1502. The signal SR2 is expressed according to the expression below.

$$SR2 = \alpha 2 * SR + N \quad (33)$$

By expressing signals of respective color components in the regions 1501 and 1502 according to a calculation expression similar to Expressions (32) and (33), a color component having a reflectance that is higher than the reflectance of another color component is emphasized more than the other color component in the respective regions.

Here, assume that a weight on the signal SR1 is 1 and that a weight on the signal SR2 is w. When the sum of signals multiplied by the weights in the regions 1501 and 1502 is used as a statistic, a signal SR' indicating the statistic is expressed according to the expression below.

$$SR' = SR1 + w*SR2 \quad (34)$$
$$= (\alpha 1 * SR + N) + w*(\alpha 2 * SR + N)$$
$$= (\alpha 1 + w\alpha 2)SR + (1 + w)N$$

A ratio Q of a power of a noise component to a power of a signal component included in the signal SR' is expressed according to the expression below.

$$Q=((1+w)^2 NP)/((\alpha 1+w\alpha 2)^2 SP) \tag{35}$$

NP in Expression (35) represents a time mean of the square of noise N, and SP represents a time means of the square of the signal SR. NP, SP, α1, and α2 do not depend on w, and therefore a value of w that minimizes the ratio Q in Expression (35) is determined as a weight that minimizes an influence of noise, and the value of w is expressed according to the expression below.

$$W=\alpha 2/\alpha 1 \tag{36}$$

Similarly, β2/β1 is determined as a weight on a G-component signal SG2, and γ2/γ1 is determined as a weight on a B-component signal SB2. Accordingly, weights on the signals SR2, SG2, and SB2 in the region 1502 are determined to be α2/α1, β2/β1, and γ2/γ1, respectively. When these weights are used, a signal (SR', SG', SB') indicating a statistic is calculated according to the expression below.

$$(SR',SG',SB')=(SR1+(\alpha 2/\alpha 1)SR2, SG1+(\beta 2/\beta 1)SG2, SB1+(\gamma 2/\gamma 1)SB2) \tag{37}$$

When a reflectance α1 is 0, α2/α1 becomes infinite. In this case, the signal SR' can be calculated by respectively replacing the weights on the signals SR1 and SR2 with 0 and α2. In a case in which a reflectance β1 or γ1 is 0, calculation is performed similarly to in a case in which the reflectance α1 is 0.

In the emphasizing process illustrated in FIG. 12 or 13, embedded information superimposed onto a color component having a low reflectance contributes little to a detection result. Therefore, in order to detect embedded information independently of a spectral reflection characteristic of an object, it is preferable that the embedded information be made redundant. The embedded information can be made redundant, for example, by superimposing the same embedded information onto each of the RGB components. In addition, the embedded information may be shifted among a plurality of color components in a time direction.

Figures 16A, 16B:
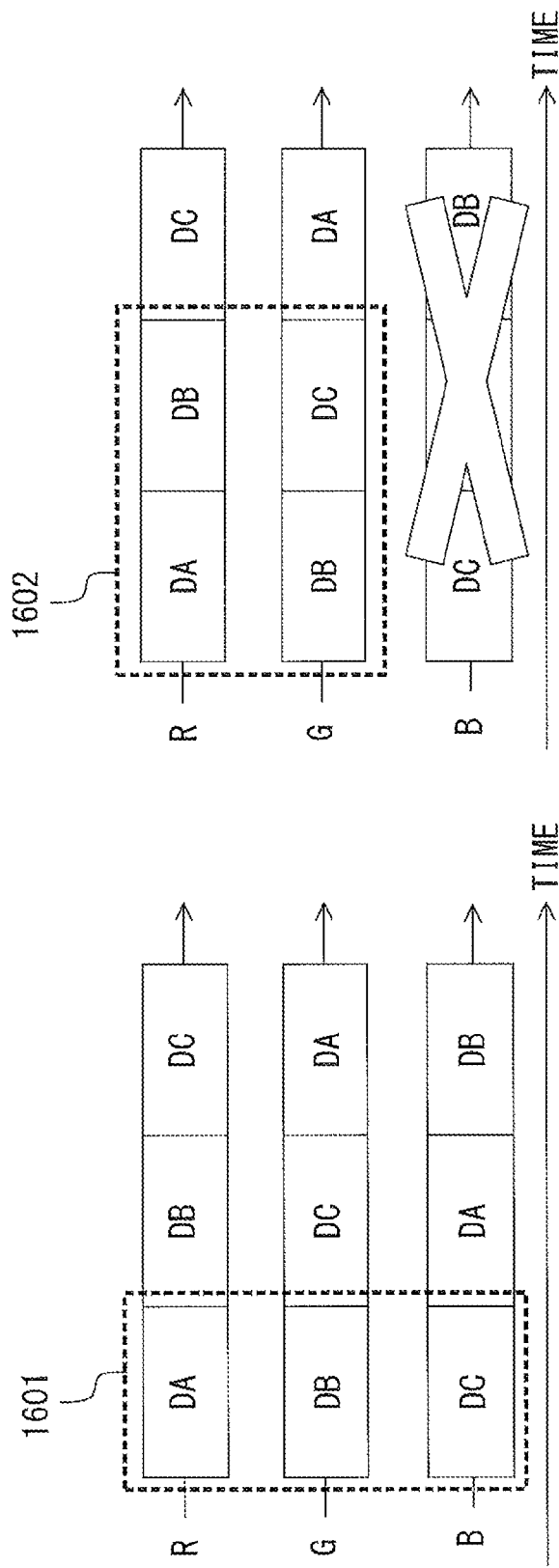
FIG. 16A and FIG. 16B illustrate embedded information shifted in a time direction.

FIG. 16A and FIG. 16B illustrate an example of embedded information shifted in a time direction. In this example, embedded information is divided into data DA, data DB, and data DC, and the data DA, the data DB, and the data DC are sequentially superimposed onto an R component. In addition, the data DB, the data DC, and the data DA are sequentially superimposed onto a G component, and the data DC, the data DA, and the data DB are sequentially superimposed onto a B component.

In the case illustrated in FIG. 16A, all of the reflectances of the RGB components are high, and therefore the data DA, the data DB, and the data DC can be detected from signals of the R component, the G component, and the B component in the first cycle, as illustrated in a broken-line rectangle 1601.

On the other hand, in the case illustrated in FIG. 16B, a reflectance of the B component is low, and therefore the data DA and the data DB are detected from signals of the R component and the G component in the first cycle, as illustrated in a broken-line rectangle 1602. Then, the data DB and the data DC are detected from signals of the R component and the G component in the second cycle.

The illuminating device 501 can superimpose embedded information onto a plurality of components in a color space as opposed to the RGB color space, such as an XYZ color space, a YUV color space, or an HLS color space. As an example, conversion from YUV components to RGB components in a YUV color space in which ranges of a U component and a V component are scaled so as to be −128 to 127 is expressed according to the expressions below.

$$R=1.000Y+1.402V \tag{41}$$

$$G=1.000Y-0.344U-0.714V \tag{42}$$

$$B=1.000Y+1.772U \tag{43}$$

The YUV color space scaled as above is also referred to as a YCbCr color space. Hereinafter, the scaled YUV color space may be referred to simply as a YUV color space. A Y component represents a brightness signal, and a U component and a V component represent color difference signals. Conversion from RGB components to YUV components is expressed according to the expressions below.

$$Y=0.299R+0.587G+0.114B \tag{44}$$

$$U=-0.169R-0.331G+0.500B \tag{45}$$

$$V=0.500R-0.419G-0.081B \tag{46}$$

When embedded information is superimposed onto the YUV components in the YUV color space, the light emission control unit 511 of FIG. 5 converts a YUV-component signal indicating the embedded information into an RGB-component signal according to Expressions (41) to (43). Then, the light emission control unit 511 controls the light emitting unit 512 by using the RGB-component signal so as to change RGB components of radiated light in time series.

In this case, the estimating unit 602 of FIG. 6 performs the estimating process of FIG. 8 or 9 so as to estimate the spectral reflection characteristic 612. Then, the detecting unit 312 converts pixel values of RGB components of an image included in the video information 611 into signals of YUV components according to Expressions (44) to (46), and emphasizes the signals of YUV components on the basis of the spectral reflection characteristic 612. The detecting unit 312 then detects the embedded information from the emphasized signals of YUV components.

When the estimated spectral reflection characteristic 612 is (α, β, γ), the expressions below are obtained by multiplying RGB components in Expressions (44) to (46) by reflectances of the respective color components.

$$Y=\alpha*0.299R+\beta*0.587G+\gamma*0.114B \tag{47}$$

$$U=-\alpha*0.169R-\beta*0.331G+\gamma*0.500B \tag{48}$$

$$V=\alpha*0.500R-\beta*0.419G-\gamma*0.081B \tag{49}$$

As an example, when the estimating process of FIG. 8 is performed such that the spectral reflection characteristic 612 is estimated, the detecting unit 312 can convert pixel values of RGB components of an image into signals of YUV components according to Expressions (47) to (49), and the detecting unit 312 can select a signal of a specific component of the YUV components. At this time, the detecting unit 312 may select signals of one or more components having an amplitude greater than a prescribed threshold as the signal of the specific component.

By using Expressions (47) to (49) instead of Expressions (44) to (46), a color component having a reflectance higher than the reflectance of another color component is emphasized more than the other component in the RGB color space. In a YUV color space in which a signal is decoded, a signal of a specific component is selected such that the selected signal of the specific component is emphasized more than a signal of another component.

Here, due to the asymmetry of conversion from the RGB color space to the YUV color space, a signal superimposed onto a component in the YUV color space may attenuate or may interfere with another component.

FIG. 17A and FIG. 17B illustrate an example of interference between a U component and a V component. A case is considered in which a sine-wave signal having an amplitude of 1 is superimposed onto a U component or a V component, a YUV-component signal is converted into an RGB-component signal according to Expressions (41) to (43), and the RGB-component signal is converted into the YUV-component signal according to Expressions (47) to (49).

As an example, when a sine-wave signal is superimposed onto a U component and $(\alpha, \beta, \gamma)=(1.0, 0.6, 0)$ is established, interference from the U component to a V component occurs in a YUV-component signal obtained from an image, as illustrated in FIG. 17A.

When a sine-wave signal is superimposed onto a V component and $(\alpha, \beta, \gamma)=(1.0, 0.6, 0)$ is established, interference from the V component to a U component occurs in a YUV-component signal obtained from an image, as illustrated in FIG. 17B.

Accordingly, the detecting unit 312 emphasizes the YUV-component signal by considering interference between components in the YUV color space. In this case, a signal of a specific component is selected from among YUV components, for example, in the following procedure.

The detecting unit 312 first converts a signal $(Y, U, V)=(0, 1, 0)$ indicating embedded information into an RGB-component signal according to Expressions (41) to (43), and converts the RGB-component signal into a YUV-component signal $(Yu, Uu, Vu)$ according to Expressions (47) to (49).

Similarly, the detecting unit 312 converts a signal $(Y, U, V)=(0, 0, 1)$ indicating embedded information into an RGB-component signal according to Expressions (41) to (43), and converts the RGB-component signal into a YUV-component signal $(Yv, Uv, Vv)$ according to Expressions (47) to (49). Then, the detecting unit 312 checks whether the inequalities below are established.

$$UD=|Uu|-|Uv|>\text{threshold} \quad (51)$$

$$VD=|Vv|-|Vu|>\text{threshold} \quad (52)$$

When Inequality (51) is established, the detecting unit 312 selects a U-component signal, and when Inequality (52) is established, the detecting unit 312 selects a V-component signal, and consequently the detecting unit 312 can select a signal of a component suitable to detect embedded information. In the example of FIG. 17A and FIG. 17B, for example, when a threshold is 0.5, the inequalities below are established.

$$UD=|0.07|-|0.10|=-0.03<0.5 \quad (53)$$

$$VD=|0.88|-|0.09|=0.79>0.5 \quad (54)$$

Accordingly, the detecting unit 312 merely selects a signal of a V component of the YUV components, and detects embedded information from the signal of the V component.

Further, when embedded information is also superimposed onto a Y component, the detecting unit 312 first converts a signal $(Y, U, V)=(1, 0, 0)$ indicating the embedded information into an RGB-component signal according to Expressions (41) to (43). Then, the detecting unit 312 converts the RGB-component signal into a YUV-component signal $(Yy, Uy, Vy)$ according to Expressions (47) to (49).

The detecting unit 312 checks whether the inequalities below, instead of Inequalities (51) and (52), are established.

$$YD=|Yy|-|Yu|-|Yv|>\text{threshold} \quad (55)$$

$$UD=|Uu|-|Uy|-|Uv|>\text{threshold} \quad (56)$$

$$VD=|Vv|-|Vy|-|Vu|>\text{threshold} \quad (57)$$

The detecting unit 312 selects a Y-component signal when Inequality (55) is established, the detecting unit 312 selects a U-component signal when Inequality (56) is established, and the detecting unit 312 selects a V-component signal when Inequality (57) is established. By doing this, a signal of a component suitable to detect embedded information can be selected.

When signals having different amplitudes are respectively superimposed onto YUV components, a value of a signal (Y, U, V) may change according to a ratio of the amplitudes. As an example, when a ratio of the amplitude of a U component to the amplitude of a V component is 1:2, the detecting unit 312 uses a signal $(Y, U, V)=(0, 1, 0)$ to calculate a signal $(Yu, Uu, Vu)$, and uses a signal $(Y, U, V)=(0, 0, 2)$ to calculate a signal $(Yv, Uv, Vv)$.

Figure 18:
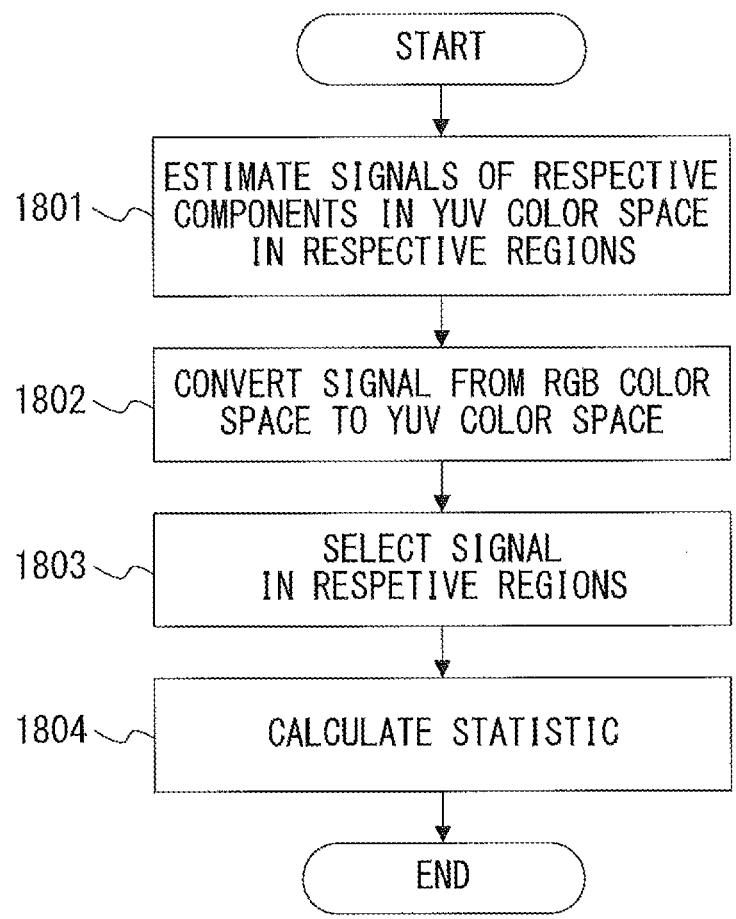
FIG. 18 is a flowchart of a third emphasizing process.

FIG. 18 is a flowchart illustrating an example of a third emphasizing process in step 703 of FIG. 7. The third emphasizing process is performed when the spectral reflection characteristic 612 has been estimated as a result of the estimating process of FIG. 9.

The detecting unit 312 first estimates an amplitude of a YUV-component signal in respective regions on the basis of the spectral reflection characteristics 612 of the respective regions (step 1801). At this time, the detecting unit 312 calculates the above signals $(Yy, Uy, Vy)$, $(Yu, Uu, Vu)$, and $(Yv, Uv, Vv)$, and obtains $|Yy|$, $|Yu|$, $|Yv|$, $|Uu|$, $|Uy|$, $|Uv|$, $|Vv|$, $|Vy|$, and $|Vu|$.

Then, the detecting unit 312 converts pixel values of RGB components in the respective regions into signals of YUV components according to Expressions (44) to (46) on the basis of the spectral reflection characteristics 612 of the respective regions (step 1802).

The detecting unit 312 selects a signal of a specific component of the YUV components in the respective regions (step 1803). At this time, the detecting unit 312 can select signals of one or more components, for example, by using Inequalities (55) to (57).

Then, the detecting unit 312 calculates a statistic of signals of the same component selected in a plurality of regions (step 1804).

As described above, by appropriately setting thresholds in Inequalities (55) to (57) and merely selecting a component that is estimated to have a signal intensity that is greater than a noise intensity, an influence of noise on a result of detecting embedded information can be suppressed.

Figure 19:
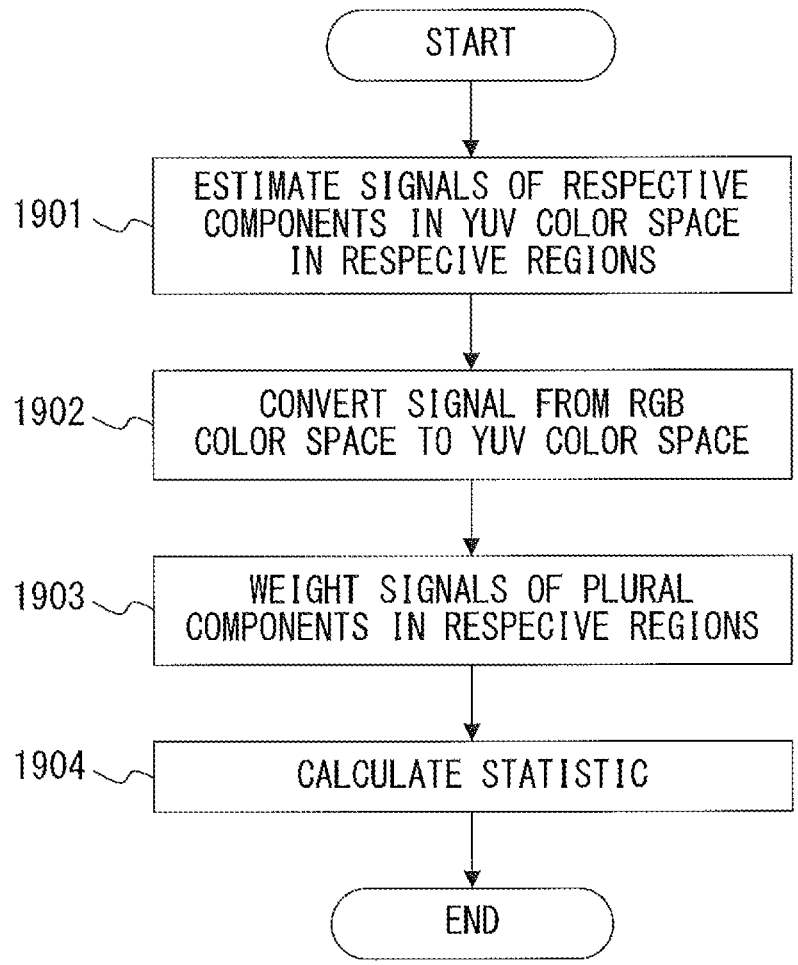
FIG. 19 is a flowchart of a fourth emphasizing process.

FIG. 19 is a flowchart illustrating an example of a fourth emphasizing process in step 703 of FIG. 7. The fourth emphasizing process is also performed when the spectral reflection characteristic 612 has been estimated as a result of the estimating process of FIG. 9. The processes of steps 1901 and 1902 in FIG. 19 are similar to the processes of steps 1801 and 1802 in FIG. 18.

Following step 1902, the detecting unit 312 weights signals of a plurality of components obtained from respective regions on the basis of the spectral reflection characteristics 612 of the respective regions (step 1903). At this time, the detecting unit 312 may weight the signals of the plurality of components, for example, by respectively using YD, UD, and VD on the left-hand sides of Inequalities (55)

to (57) as weights on Y, U, and V components. By doing this, signals of respective components are emphasized according to weights on the signals in respective regions.

The detecting unit 312 then calculates a statistic of signals of the same component that have been weighted in a plurality of regions (step 1904).

A case is considered in which an image is divided into four regions, as illustrated in FIG. 14, and a mean value (R, G, B) of RGB components and a spectral reflection characteristic ($\alpha$, $\beta$, $\gamma$) estimated from (R, G, B) in each of the regions 1401 to 1404 have the values below.
Region 1401
(R, G, B)=(255, 0, 0)
($\alpha$, $\beta$, $\gamma$)=(1, 0, 0)
Region 1402
(R, G, B)=(145, 190, 232)
($\alpha$, $\beta$, $\gamma$)=(0.55, 0.76, 0.91)
Region 1403
(R, G, B)=(146, 208, 80)
($\alpha$, $\beta$, $\gamma$)=(0.57, 0.82, 0.31)
Region 1404
(R, G, B)=(255, 255, 255)
($\alpha$, $\beta$, $\gamma$)=(1, 1, 1)

When embedded information is superimposed onto U and V components, the detecting unit 312 can respectively use UD and VD on the left-hand sides of Inequalities (51) and (52) as weights on the U and V components. In this case, the detecting unit 312 multiplies signals (SU1, SV1) to (SU4, SV4) of U and V components obtained from the regions 1401 to 1414 by the weights on the U and V components in the respective regions.

When the sum of signals multiplied by the weights in the regions 1401 to 1404 is used as a statistic, a signal (SU', SV') indicating the statistic is calculated according to the expression below.

$$(SU', SV') = (-0.24 * SU1, 0.70 * SV1) + \qquad (61)$$
$$(0.84 * SU2, 0.59 * SV2) +$$
$$(0.31 * SU3, 0.57 * SV3) +$$
$$(1.0 * SU4, 1.0 * SV4)$$
$$= (-0.24SU1 + 0.84SU2 + 0.31SU3 + SU4,$$
$$0.7SV1 + 0.59SV2 + 0.57SV3 + SV4)$$

As described above, an influence of noise to a result of detecting embedded information can be suppressed by weighting signals of a plurality of components on the basis of an amplitude of a YUV-component signal estimated from spectral reflection characteristics of respective regions.

A weighting method for minimizing an influence of noise on the basis of a ratio of noise to a signal is described next. A case is considered in which an image is divided into two regions, as illustrated in FIG. 15, and spectral reflection characteristics ($\alpha$, $\beta$, $\gamma$) of the regions 1501 and 1502 are ($\alpha$1, $\beta$1, $\gamma$1) and ($\alpha$2, $\beta$2, $\gamma$2), respectively.

Assume that signals superimposed onto YUV components of light are SY, SU, and SV, respectively. Also assume that (YD, UD, VD) in the region 1501 is (y1, u1, v1) and that (YD, UD, VD) in the region 1502 is (y2, u2, v2).

A Y-component signal is considered first. Assume that white noise N uniformly distributing in all the regions has been superimposed onto a Y-component signal SY1 obtained from the region 1501. The signal SY1 is expressed according to the expression below.

$$SY1 = y1 * SY + N \qquad (62)$$

Assume that the white noise N has been superimposed onto a Y-component signal SY2 obtained from the region 1502. The signal SY2 is expressed according to the expression below.

$$SY2 = y2 * SY + N \qquad (63)$$

Here, assume that a weight on the signal SY1 is 1 and that a weight on the signal SY2 is w. When the sum of signals multiplied by the weights in the regions 1501 and 1502 is used as a statistic, a signal SY' indicating the statistic is expressed according to the expression below.

$$SY' = SY1 + w * SY2 \qquad (64)$$
$$= (y1 * SY + N) + w * (y2 * SY + N)$$
$$= (y1 + wy2)SY + (1 + w)N$$

A ratio Q of a power of a noise component to a power of a signal component included in the signal SY' is expressed according to the expression below.

$$Q = ((1+w)^2 NP)/((y1+wy2)^2 SP) \qquad (65)$$

NP in Expression (65) represents a time mean of the square of noise N, and SP represents a time mean of the square of a signal SY. NP, SP, y1, and y2 do not depend on w, and therefore a value of w that minimizes the ratio Q in Expression (65) is determined as a weight that minimizes an influence of noise, and the value of w is expressed according to the expression below.

$$W = y2/y1 \qquad (66)$$

Similarly, a weight on a U-component signal SU2 is expressed by u2/u1, and a weight on a V-component signal SV2 is expressed by v2/v1. Accordingly, weights on the signals SY2, SU2, and SV2 in the region 1502 are expressed by y2/y1, u2/u1, and v2/v1, respectively. When these weights are used, a signal (SY', SU', SV') indicating a statistic is calculated according to the expression below.

$$(SY', SU', SV') = \qquad (67)$$
$$(SY1 + (y2/y1)SY2, SU1 + (u2/u1)SU2, SV1 + (v2/v1)SV2)$$

When y1 is 0, y2/y1 becomes infinite. In this case, the signal SY' can be calculated by respectively replacing the weights on the signals SY1 and SY2 with 0 and Y2. In a case in which u1 or v1 is 0, calculation is performed similarly to in a case in which y1 is 0.

Figure 20:
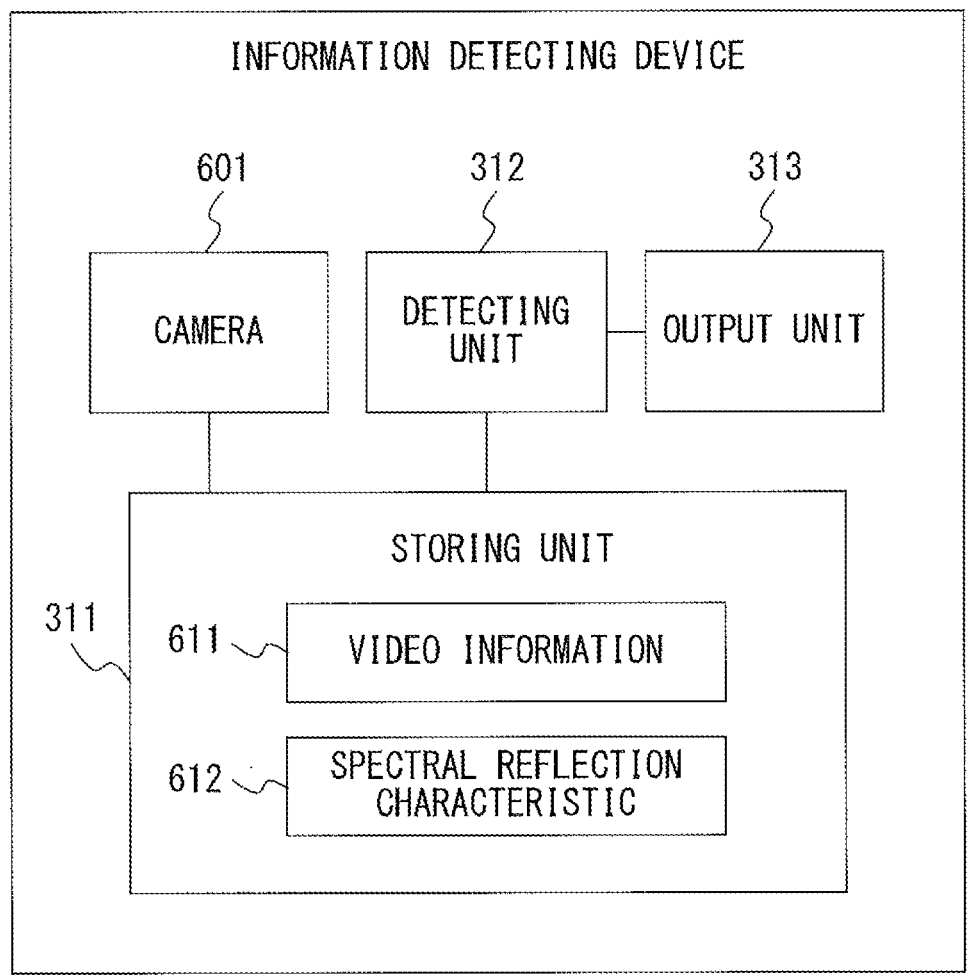
FIG. 20 illustrates a second specific example of an information detecting device.

FIG. 20 illustrates a second specific example of the information detecting device 301 of FIG. 3. An information detecting device 301 of FIG. 20 includes a configuration in which the estimating unit 602 is excluded from the information detecting device 301 of FIG. 6. In this case, a spectrometer provided outside the information detecting device 301 measures a spectral reflection characteristic 612 in a range including an object, and transmits the measured spectral reflection characteristic 612 to the information detecting device 301. The information detecting device 301 then stores the received spectral reflection characteristic 612 in a storing unit 311.

The storing unit 311 may store a spectral reflection characteristic 612 that has been measured in advance, or may store a spectral reflection characteristic 612 that has been received from the spectrometer when a camera 601 photographs an object. Alternatively, when the camera 601 photographs an object, the spectrometer may measure the spectral reflection characteristic 612, and display the spectral reflection characteristic 612 on a screen, and a user may input the displayed spectral reflection characteristic 612 to the information detecting device 301 via an input device.

Figure 21:
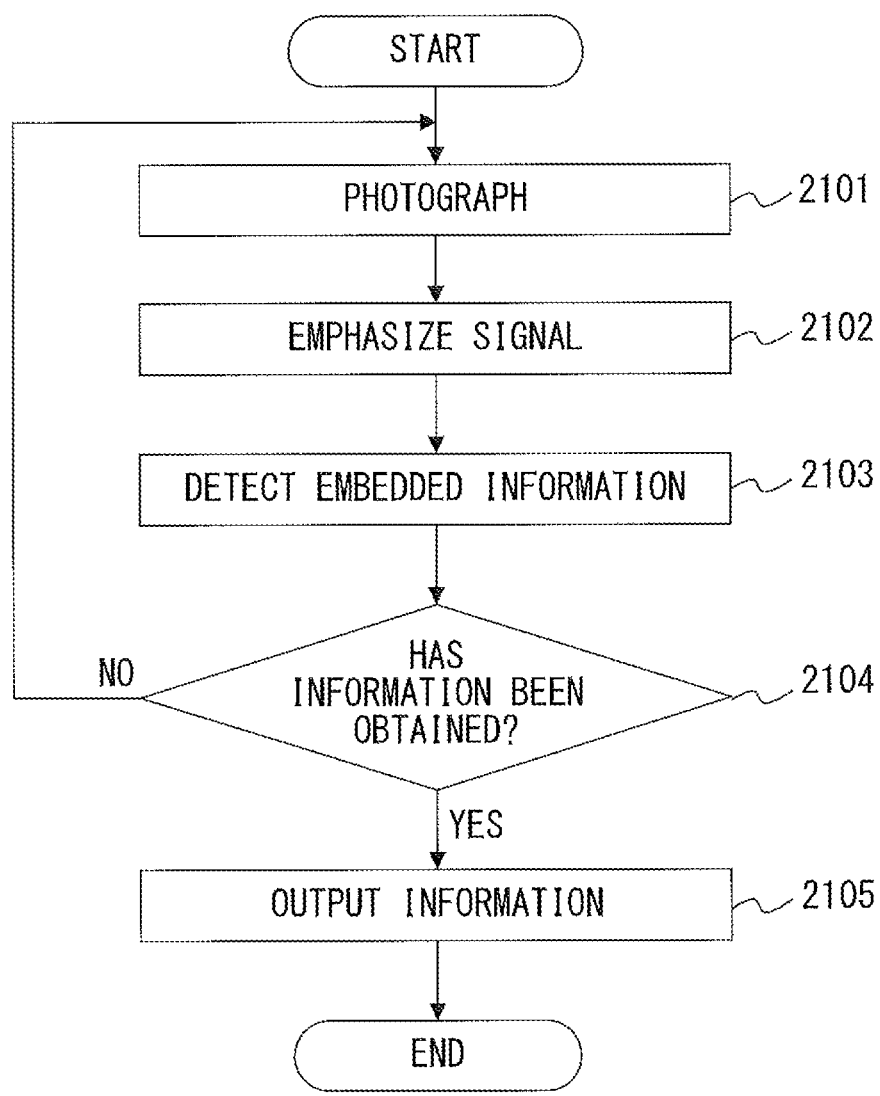
FIG. 21 is a flowchart illustrating a second specific example of an information detecting process.

FIG. 21 is a flowchart illustrating an example of an information detecting process performed by the information detecting device 301 of FIG. 20. The processes of steps 2101 to 2105 in FIG. 21 are similar to the processes of step 701 and steps 703 to 706 in FIG. 7.

In this case, the detecting unit 312 selects a signal of a specific component of signals of a plurality of components in a color space on the basis of the spectral reflection characteristic 612 in step 2102, and detects embedded information from the selected signal of the specific component in step 2103. The signals of the plurality of components may be signals of RGB components, or may be signals of YUV components.

In the information detecting process described above, a process of estimating the spectral reflection characteristic 612 is omitted, and consequently a load on the information detecting device 301 is reduced.

Figure 22:
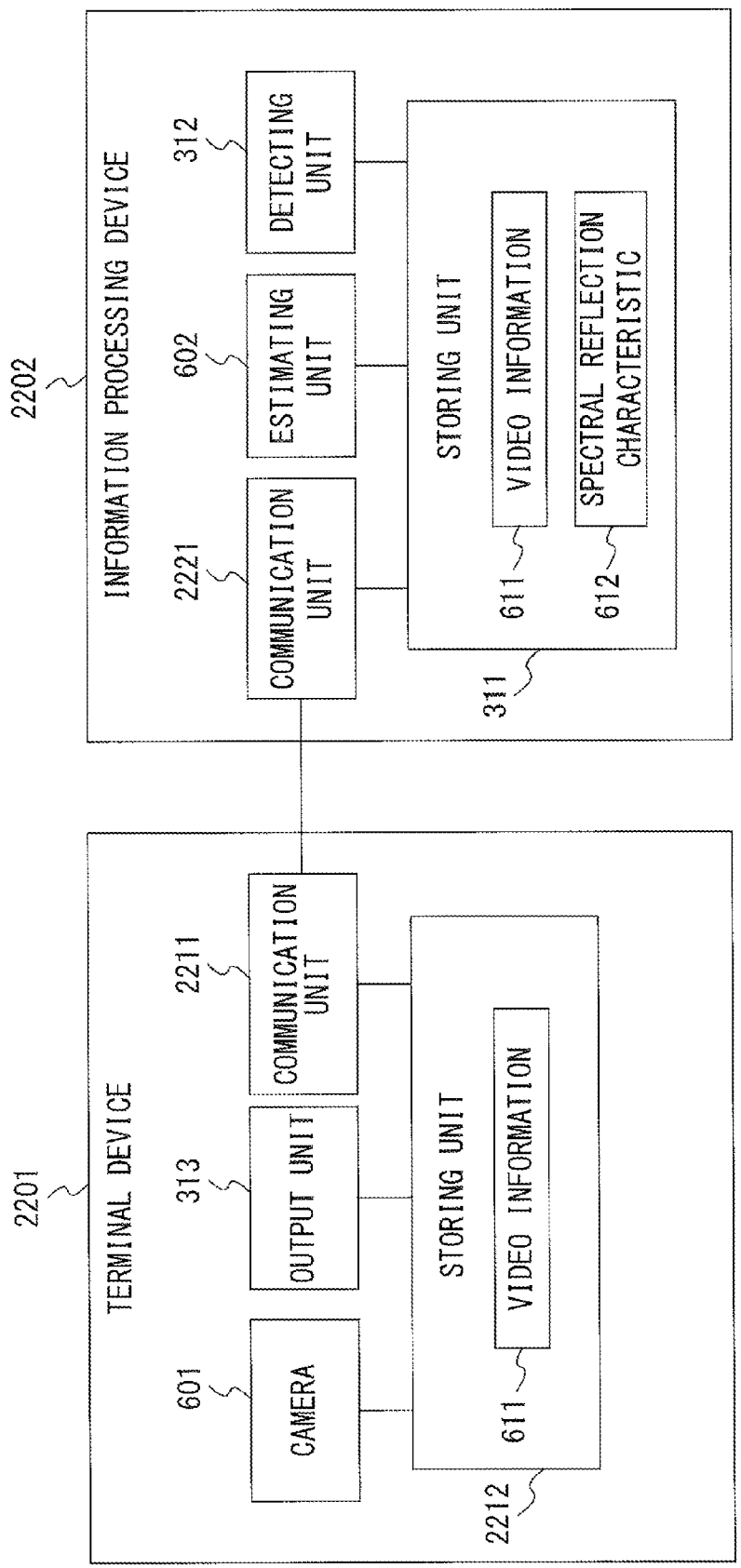
FIG. 22 illustrates a configuration of an information detecting system.

FIG. 22 illustrates an exemplary configuration of an information detecting system in which a device that photographs an object is separated from a device that detects embedded information from a photographed image. The information detecting system of FIG. 22 includes a terminal device 2201 and an information processing device 2202. The terminal device 2201 includes an output unit 313, a camera 601, a communication unit 2211, and a storing unit 2212. The information processing device 2202 includes a storing unit 311, a detecting unit 312, an estimating unit 602, and a communication unit 2221.

The storing unit 2212 of the terminal device 2201 stores video information 611, and the communication unit 2211 and the communication unit 2221 can transmit or receive information to/from each other via a communication network.

Figure 23:
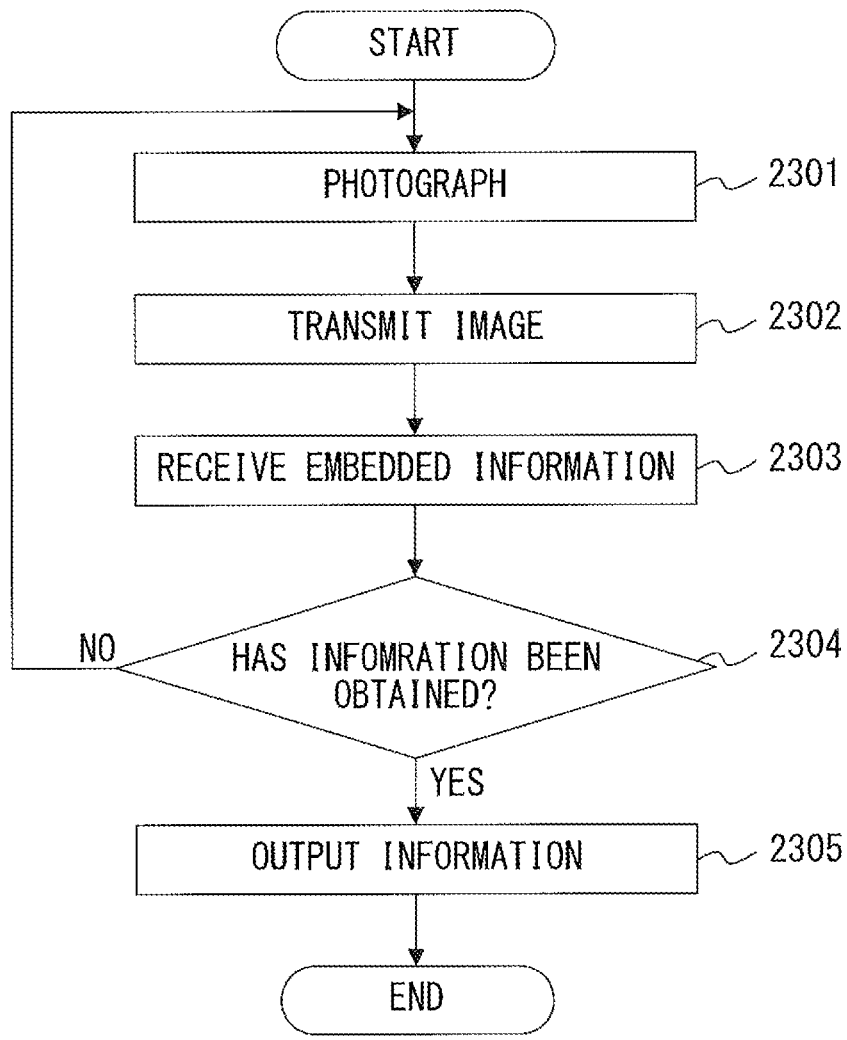
FIG. 23 is a flowchart of a process performed by a terminal device.

FIG. 23 is a flowchart illustrating an example of a process performed by the terminal device 2201 of FIG. 22. The processes of steps 2301, 2304, and 2305 in FIG. 23 are similar to the processes of steps 701, 705, and 706 in FIG. 7.

Following step 2301, the communication unit 2211 transmits an image included in the video information 611 to the information processing device 2202 (step 2302). The communication unit 2211 then receives embedded information from the information processing device 2202, and the terminal device 2201 performs the process of step 2304 and the processes that follow on the basis of the received embedded information.

Figure 24:
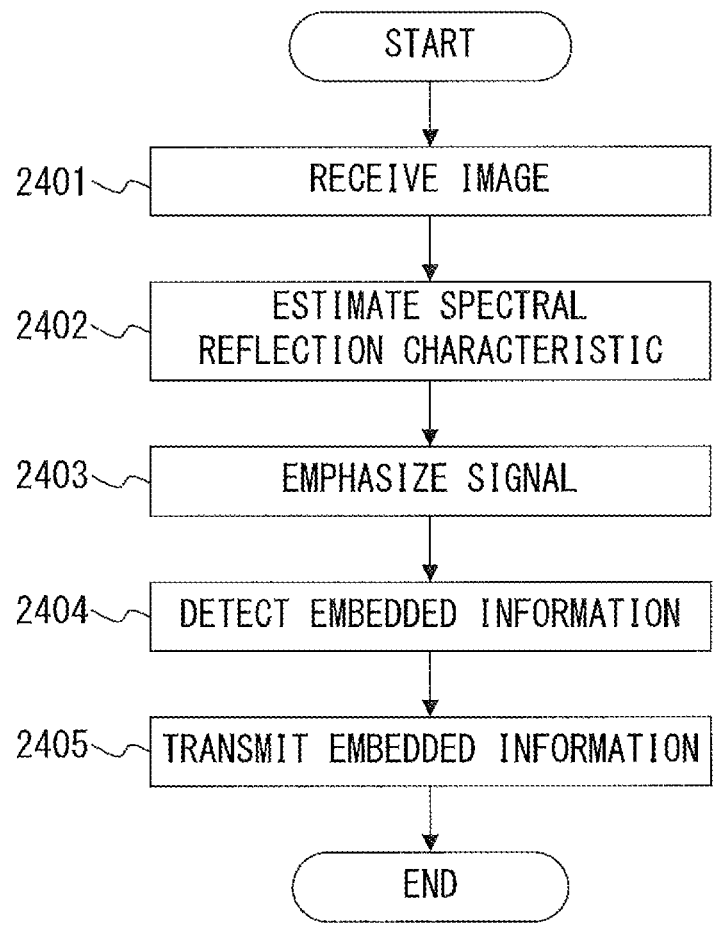
FIG. 24 is a flowchart of a process performed by an information processing device.

FIG. 24 is a flowchart illustrating an example of a process performed by the information processing device 2202 of FIG. 22. The processes of steps 2402 to 2404 in FIG. 24 are similar to the processes of steps 702 to 704 in FIG. 7.

The communication unit 2221 first receives an image from the terminal device 2201, and the storing unit 311 stores the received image as the video information 611 (step 2401). Then, the information processing device 2202 performs the processes of steps 2402 to 2404 on the basis of the image included in the video information 611. Following step 2404, the communication unit 2221 transmits embedded information detected from the image to the terminal device 2201 (step 2405).

In the information detecting system described above, the terminal device 2201 merely photographs an image and transmits the image, and therefore a load on the terminal device 2201 is greatly reduced.

The configuration of FIG. 5 illustrating the illuminating device 501 is an example, and some of the components may be omitted or changed according to purposes or conditions of the illuminating device 501. As an example, the light emitting unit 512 may include a light emitter of a color component as opposed to RGB components. Further, an object is irradiated with light onto which embedded information has been superimposed by using a video projecting device such as a projector, instead of the illuminating device 501.

The configurations of FIGS. 3, 6, and 20 illustrating the information detecting device 301 are examples, and some of the components may be omitted or changed according to purposes or conditions of the information detecting device 301. As an example, in the information detecting device 301 of FIG. 6 or 20, when the video information 611 is received from an external device, the camera 601 can be omitted. In the information detecting device 301 of FIG. 6, when a process of estimating the spectral reflection characteristic 612 is performed by an external device, the estimating unit 602 can be omitted.

The flowcharts of FIGS. 4, 7 to 9, 12, 13, 18, 19, and 21 are examples, and some of the processes may be omitted or changed according to the configuration or conditions of the information detecting device 301. As an example, in the information detecting processes of FIGS. 7 and 21, when the video information 611 is received from an external device, the processes of steps 701 and 2101 can be omitted. In the information detecting process of FIG. 7, when a process of estimating the spectral reflection characteristic 612 is performed by an external device, the process of step 702 can be omitted.

In the estimating processes of FIGS. 8 and 9, the estimating unit 602 may estimate the spectral reflection characteristic 612 by using a pixel value of another color component instead of pixel values of RGB components. When embedded information is superimposed onto components in another color space such as an XYZ color space or an HLS color space, instead of an RGB color space or a YUV color space, the detecting unit 312 emphasizes a signal by using the other color space instead of the YUV color space in the emphasizing processes of FIGS. 18 and 19.

The configuration of FIG. 22 illustrating the information detecting system is an example, and some of the components may be omitted or changed according to purposes or conditions of the information detecting system. As an example, in the terminal device 2201, when the video information 611 is received from an external device, the camera 601 can be omitted. In the information processing device 2202, when a process of estimating the spectral reflection characteristic 612 is performed by an external device, the estimating unit 602 can be omitted.

The flowcharts of FIGS. 23 and 24 are examples, and some of the processes may be omitted or changed according to the configuration or conditions of the information detecting system. As an example, when the terminal device 2201 receives the video information 611 from an external device, the process of step 2301 in FIG. 23 may be omitted.

When the terminal device 2201 estimates the spectral reflection characteristic 612, and transmits the spectral reflection characteristic 612 to the information processing device 2202, the process of step 2402 in FIG. 24 can be omitted. Further, when the terminal device 2201 emphasizes a signal, and transmits the signal to the information processing device 2202, the process of step 2403 can also be omitted.

In the estimating process of FIG. 9, when the terminal device 2201 performs the processes of steps 901 and 902, and transmits feature amounts of respective regions to the information processing device 2202, the estimating unit 602 only performs the process of step 903.

The images of FIGS. 2, 10, 11, 14, and 15 are examples, and another image may be used according to the configuration or conditions of the information detecting device 301 or the information detecting system. As an example, when an image is divided into a plurality of regions, the number of regions may be an integer that is greater than or equal to 2, and the shape of each of the regions may be a shape as opposed to a rectangle.

The information detecting devices 301 of FIGS. 3, 6, and 20 and the terminal device 2201 and the information processing device 2202 of FIG. 22 can be implemented by using, for example, an information processing device (a computer) as illustrated in FIG. 25.

The information processing device of FIG. 25 includes a Central Processing Unit (CPU) 2501, a memory 2502, an input device 2503, an output device 2504, an auxiliary storage device 2505, a medium driving device 2506, and a network connecting device 2507. These components are mutually connected via a bus 2508.

Examples of the memory 2502 include a semiconductor memory such as a Read Only Memory (ROM), a Random Access Memory (RAM), or a flash memory. The memory 2502 stores a program and data for a process performed by the information detecting device 301, the terminal device 2201, or the information processing device 2202. The memory 2502 can be used as the storing unit 311 or the storing unit 2212.

When the information processing device is the information detecting device 301 or the information processing device 2202, the CPU 2501 (a processor) operates as the detecting unit 312 and the estimating unit 602, for example, by using the memory 2502 to execute a program.

Examples of the input device 2503 include a keyboard and a pointing device, and the input device 2503 is used to input instructions or information from a user or an operator. Examples of the output device 2504 include a display device, a printer, and a speaker, and the output device 2504 is used to output inquiries or processing results to a user or an operator. The processing result may be embedded information that corresponds to prescribed information, or other information specified by the embedded information. The output device 2504 can be used as the output unit 313.

Examples of the auxiliary storage device 2505 include a magnetic disk device, an optical disk device, a magneto-optic disk device, and a tape device. The auxiliary storage device 2505 may be a hard disk drive or a flash memory. The information processing device can store a program and data in the auxiliary storage device 2505, and can use the program and the data by loading them onto the memory 2502. The auxiliary storage device 2505 can be used as the storing unit 311 or the storing unit 2212.

The medium driving device 2506 drives a portable recording medium 2509, and accesses the content recorded in the portable recording medium 2509. Examples of the portable recording medium 2509 include a memory device, a flexible disk, an optical disk, and a magneto-optic disk. The portable recording medium 2509 may be a Compact Disk Read Only Memory (CD-ROM), a Digital Versatile Disk (DVD), a Universal Serial Bus (USB) memory, or the like. A user or an operator can store a program and data in the portable recording medium 2509, and can use the program and the data by loading them onto the memory 2502.

As described above, a computer-readable recording medium that has stored a program and data is a physical (non-transitory) recording medium such as the memory 2502, the auxiliary storage device 2505, or the portable recording medium 2509.

The network connecting device 2507 is a communication interface that is connected to a communication network such as a Local Area Network (LAN) or the Internet so as to perform data conversion accompanying communication. The information processing device can receive a program and data from an external device via the network connecting device 2507, and can use the program and the data by loading them onto the memory 2502. The network connecting device 2507 can be used as the communication unit 2211 or the communication unit 2221.

When the information processing device is the information detecting device 301 or the terminal device 2201, the information processing device may include an imaging device such as a camera 601, or may include a device for speech such as a microphone or a speaker.

The information processing device does not need to include all of the components illustrated in FIG. 25, and some of the components can be omitted according to purposes or conditions. As an example, when instructions or information are not input from a user or an operator, the input device 2503 may be omitted. When the information processing device does not access the removable portable medium 2509 or the communication network, the medium driving device 2506 or the network connecting device 2507 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information detecting device comprising:
a memory that stores video information obtained by photographing an object that reflects light in which embedded information is superimposed onto a plurality of components in a color space;
a processor that detects the embedded information from an emphasized signal obtained from an image included in the video information by emphasizing a first color component more than a second color component according to a spectral reflection characteristic of a surface of the object, the first color component and the second color component being from among a plurality of color components that correspond to a plurality of wavelengths, the first color component having a reflectance higher than a reflectance of the second color component in the spectral reflection characteristic; and
a display device that outputs information on the basis of the embedded information detected by the processor.

2. The information detecting device according to claim 1, wherein
the processor selects a signal of a specific component according to the spectral reflection characteristic of the surface of the object, and detects the embedded information from the selected signal.

3. The information detecting device according to claim 1, wherein
the processor estimates the spectral reflection characteristic on the basis of a feature amount of the image.

4. The information detecting device according to claim 3, wherein
the processor obtains a reflectance that corresponds to each of the plurality of color components on the basis of a plurality of feature amounts of the plurality of color components in the image, and uses a plurality of reflectances that respectively correspond to the plurality of color components as the spectral reflection characteristic.

5. The information detecting device according to claim 3, wherein
the processor divides the image into a plurality of regions, estimates the spectral reflection characteristic that corresponds to each of the plurality of regions on the basis of a feature amount of each of the plurality of regions, and emphasizes the first color component on the basis of the spectral reflection characteristic that corresponds to each of the plurality of regions.

6. The information detecting device according to claim 5, wherein
the processor selects a signal of a specific component from among a plurality of signals of a plurality of components obtained in each of the plurality of regions according to the spectral reflection characteristic that corresponds to each of the plurality of regions, and detects the embedded information by using a plurality of signals selected in the plurality of regions.

7. The information detecting device according to claim 6, wherein
the color space is defined by the plurality of color components, and the plurality of signals of the plurality of components obtained in each of the plurality of regions are a plurality of signals of the plurality of color components.

8. The information detecting device according to claim 6, wherein
the color space is defined by a plurality of color difference components, and the plurality of signals of the plurality of components obtained in each of the regions are a plurality of signals of the plurality of color difference components.

9. The information detecting device according to claim 5, wherein
the processor weights the plurality of signals of the plurality of components obtained in each of the plurality of regions according to the spectral reflection characteristic that corresponds to each of the plurality of regions, and detects the embedded information by using a plurality of signals weighted in the plurality of regions.

10. An information detecting system comprising a terminal device and an information processing device, wherein
the terminal device includes:
a memory that stores video information obtained by photographing an object that reflects light in which embedded information is superimposed onto a plurality of components in a color space;
a first communication device that transmits the video information to the information processing device; and
a display device that outputs information on the basis of the embedded information received from the information processing device, and
the information processing device includes:
a processor that detects the embedded information from an emphasized signal obtained from an image included in the video information by emphasizing a first color component more than a second color component according to a spectral reflection characteristic of a surface of the object, the first color component and the second color component being from among a plurality of color components that correspond to a plurality of wavelengths, the first color component having a reflectance higher than a reflectance of the second color component in the spectral reflection characteristic; and
a second communication device that transmits the embedded information detected by the processor to the terminal device.

11. The information detecting system according to claim 10, wherein
the processor estimates the spectral reflection characteristic on the basis of a feature amount of the image.

12. A non-transitory computer-readable recording medium having stored therein an information detecting program for causing a computer to execute a process comprising:
referring to a memory that stores video information obtained by photographing an object that reflects light in which embedded information is superimposed onto a plurality of components in a color space;
detecting the embedded information from an emphasized signal obtained from an image included in the video information by emphasizing a first color component more than a second color component according to a spectral reflection characteristic of a surface of the object, the first color component and the second color component being from among a plurality of color components that correspond to a plurality of wavelengths, the first color component having a reflectance higher than a reflectance of the second color component in the spectral reflection characteristic; and
outputting information on the basis of the detected embedded information.

13. The non-transitory computer-readable recording medium according to claim 12, wherein
the process further comprises estimating the spectral reflection characteristic on the basis of a feature amount of the image.

14. An information detecting method comprising:
referring to, by a processor, a memory that stores video information obtained by photographing an object that reflects light in which embedded information is superimposed onto a plurality of components in a color space;
detecting, by the processor, the embedded information from an emphasized signal obtained from an image included in the video information by emphasizing a first color component more than a second color component according to a spectral reflection characteristic of a surface of the object, the first color component and the second color component being from among a plurality of color components that correspond to a plurality of wavelengths, the first color component having a reflectance higher than a reflectance of the second color component in the spectral reflection characteristic; and outputting information on the basis of the detected embedded information.

15. The information detecting method according to claim 14, further comprising:

estimating the spectral reflection characteristic on the basis of a feature amount of the image.

16. The information detecting method according to claim 1, wherein the video information is obtained by a camera that photographs the object.

17. The information detecting method according to claim 1, wherein the display device displays a text, an illustration or an image on a screen on the basis of the embedded information.

18. The information detecting method according to claim 1, wherein the embedded information is superimposed onto the light by an illuminating device that changes a plurality of color components of the light in time series by controlling an emitted light amount or a phase of a light emitter and that irradiates the object with the light.

* * * * *